United States Patent
Golitschek Edler Von Elbwart et al.

(10) Patent No.: US 12,028,294 B2
(45) Date of Patent: *Jul. 2, 2024

(54) TDD UPLINK/DOWNLINK RE-CONFIGURATION MECHANISM

(71) Applicant: Sun Patent Trust, New York, NY (US)

(72) Inventors: Alexander Golitschek Edler Von Elbwart, Darmstadt (DE); Hidetoshi Suzuki, Kanagawa (JP); Lilei Wang, Beijing (CN)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,542

(22) Filed: Apr. 7, 2023

(65) Prior Publication Data
US 2023/0246799 A1    Aug. 3, 2023

Related U.S. Application Data

(63) Continuation of application No. 17/402,093, filed on Aug. 13, 2021, now Pat. No. 11,652,601, which is a
(Continued)

(51) Int. Cl.
*H04L 5/22* (2006.01)
*H04L 1/1829* (2023.01)
*H04L 5/00* (2006.01)

(52) U.S. Cl.
CPC .............. *H04L 5/22* (2013.01); *H04L 1/1854* (2013.01); *H04L 5/005* (2013.01)

(58) Field of Classification Search
None
See application file for complete search history.

(56) References Cited

U.S. PATENT DOCUMENTS 8,209,576 B2    6/2012    Zhang
8,948,105 B2    2/2015    Zhang et al.
(Continued)

FOREIGN PATENT DOCUMENTS

CN    1481180 A    3/2004
CN    1742454 A    3/2006
(Continued)

OTHER PUBLICATIONS

3GPP TS 25.331 V6.7.0, Sep. 2005. (1166 pages).
(Continued)

*Primary Examiner* — Kodzovi Acolatse
(74) *Attorney, Agent, or Firm* — Seed IP Law Group LLP

(57) ABSTRACT

The invention relates to methods for communicating within a communication system when re-configured from a source to a target uplink/downlink configuration. The invention is also providing mobile station for performing these methods, and computer readable media the instructions of which cause the mobile station to perform the methods described herein. Specifically, the invention suggests to perform PUSCH transmissions in response to Downlink Control Information, DCI, transmissions such that the source uplink/downlink configuration is applied to PUSCH transmissions relating to DCI transmissions received up to and including subframe N−6, a predefined uplink/downlink configuration is applied to PUSCH transmissions relating to DCI transmissions received during subframes N−5 to N−1; and the target uplink/downlink configuration is applied to PUSCH transmissions relating to DCI transmissions received from subframe N onward.

19 Claims, 11 Drawing Sheets

Related U.S. Application Data continuation of application No. 16/733,000, filed on Jan. 2, 2020, now Pat. No. 11,121,849, which is a continuation of application No. 16/352,564, filed on Mar. 13, 2019, now Pat. No. 10,560,250, which is a continuation of application No. 15/845,706, filed on Dec. 18, 2017, now Pat. No. 10,291,385, which is a continuation of application No. 14/909,975, filed as application No. PCT/CN2013/081221 on Aug. 9, 2013, now Pat. No. 9,876,628.

(56) References Cited

U.S. PATENT DOCUMENTS

| | | | |
|---|---|---|---|
| 9,066,342 | B2 | 6/2015 | Yang et al. |
| 9,641,027 | B2 | 5/2017 | Tsuji et al. |
| 2006/0056501 | A1 | 3/2006 | Shinoi et al. |
| 2006/0209726 | A1 | 9/2006 | Kawasumi |
| 2008/0076462 | A1 | 3/2008 | Iochi et al. |
| 2009/0249153 | A1 | 10/2009 | Zhang |
| 2010/0080166 | A1 | 4/2010 | Palanki et al. |
| 2010/0278080 | A1 | 11/2010 | Pan et al. |
| 2012/0120854 | A1 | 5/2012 | Zhang et al. |
| 2012/0188516 | A1 | 7/2012 | Kashiwagi et al. |
| 2012/0269180 | A1* | 10/2012 | Li .................... H04L 1/1887 370/336 |
| 2012/0294206 | A1 | 11/2012 | Zhang et al. |
| 2013/0039193 | A1 | 2/2013 | Yin et al. |
| 2013/0188533 | A1 | 7/2013 | He et al. |
| 2013/0194980 | A1 | 8/2013 | Yin et al. |
| 2013/0194982 | A1 | 8/2013 | Fwu et al. |
| 2013/0272169 | A1 | 10/2013 | Wang et al. |
| 2014/0044066 | A1* | 2/2014 | Hsieh .................... H04L 5/0055 370/329 |
| 2014/0056188 | A1 | 2/2014 | Yang et al. |
| 2014/0198733 | A1 | 7/2014 | Yin et al. |
| 2014/0301290 | A1* | 10/2014 | He .................... H04W 72/1215 370/329 |
| 2014/0339913 | A1 | 11/2014 | Tsuji et al. |
| 2015/0003353 | A1 | 1/2015 | Yang et al. |
| 2015/0043391 | A1* | 2/2015 | Yin .................... H04L 5/22 370/280 |
| 2015/0188690 | A1 | 7/2015 | Khoryaev et al. |
| 2015/0264678 | A1* | 9/2015 | Yin .................... H04L 5/00 370/329 |
| 2016/0056947 | A1* | 2/2016 | Tiirola .................... H04L 5/003 370/280 |

FOREIGN PATENT DOCUMENTS

| | | |
|---|---|---|
| CN | 1969483 A | 5/2007 |
| CN | 101286792 A | 10/2008 |
| CN | 101414902 A | 4/2009 |
| CN | 101841400 A | 9/2010 |
| CN | 101926214 A | 12/2010 |
| CN | 102025411 A | 4/2011 |
| CN | 102076031 A | 5/2011 |
| CN | 102165727 A | 8/2011 |
| CN | 102223219 A | 10/2011 |
| CN | 102415014 A | 4/2012 |
| EP | 1376950 A1 | 1/2004 |
| WO | WO 2012157967 A2 | 11/2012 |
| WO | WO 2013042291 A1 | 3/2013 |
| WO | WO 2013058623 A1 | 4/2013 |
| WO | WO 2013105838 A1 | 7/2013 |
| WO | WO-2014049169 A1 * | 4/2014 .......... H04L 1/1854 |

OTHER PUBLICATIONS

3GPP TS 36.211 V8.9.0, "3rd Generation Partnership Project; Technical Specification Group Radio Access Network; Evolved Universal Terrestrial Radio Access (E-UTRA); Physical channels and modulation (Release 8)," Dec. 2009, 83 pages.

3GPP TS 36.212 V11.3.0, "3rd Generation Partnership Project; Technical Specification Group Radio Access Network; Evolved Universal Terrestrial Radio Access (E-UTRA); Multiplexing and channel coding (Release 11)," Jun. 2013, 84 pages.

3GPP TS 36.213 V11.1.0, "3rd Generation Partnership Project; Technical Specification Group Radio Access Network; Evolved Universal Terrestrial Radio Access (E-UTRA); Physical layer procedures (Release 11)," Dec. 2012. (160 pages).

3GPP TS 36.213 V11.3.0, "3rd Generation Partnership Project; Technical Specification Group Radio Access Network; Evolved Universal Terrestrial Radio Access (E-UTRA); Physical layer procedures (Release 11)," Jun. 2013, 10 pages.

3GPP TS 36.321 V11.3.0, "3rd Generation Partnership Project; Technical Specification Group Radio Access Network; Evolved Universal Terrestrial Radio Access (E-UTRA); Medium Access Control (MAC) protocol specification (Release 11)," Jun. 2013, 57 pages.

Alcatel-Lucent Shanghai Bell, Alcatel-Lucent, "Discussion on HARQ/ scheduling in TDD eIMTA," R1-132054, 3GPP TSG RAN WG1 Meeting #73, Agenda Item: 6.2.3.3, Fukuoka, Japan, May 20-24, 2013, 5 pages.

Alcatel-Lucent Shanghai Bell, Alcatel-Lucent, "Discussion on timing issues with dynamic TDD UL-DL configuration," R1-122510, 3GPP TSG RAN WG1 Meeting #69, Agenda item: 7.10.5, Prague, Czech Republic, May 21-25, 2012. (9 pages).

Chinese Office Action, dated Jul. 5, 2021, for Chinese Application No. 201910370441.3, 14 pages. (with English Translation).

Extended European Search Report, dated Jan. 3, 2020, for European Application No. 19198860.9, 10 pages.

Huawei, HiSilicon, "UL power control for TDD eIMTA," R1-132406, Agenda Item: 6.2.3.1, 3GPP TSG RAN WG1 Meeting #73, Fukuoka, Japan, May 20-24, 2013, 5 pages.

International Search Report, dated May 16, 2014, for International Application No. PCT/CN2013/081221, 2 pages.

LG Electronics, "Signaling Mechanisms for TDD eIMTA," R1-132231, Agenda Item: 6.2.3.2, 3GPP TSG RAN WG1 Meeting #73, Fukuoka, Japan, May 20-24, 2013, 5 pages.

Notice of Reasons for Rejection, dated Aug. 1, 2017, for Japanese Application No. 2016-532189, 9 pages (with English translation).

Sesia et al., "LTE: The UMTS Long Term Evolution—From Theory to Practice," Ch. 9.3, Wiley, 2009, 21 pages.

The First Office Action, dated Aug. 1, 2018, for corresponding Chinese Application No. 201380079952.0, 16 pages (With English Translation).

* cited by examiner

| Uplink-downlink configuration | Downlink-to-Uplink Switch-point periodicity | Subframe number | | | | | | | | | | Number of | | |
|---|---|---|---|---|---|---|---|---|---|---|---|---|---|---|
| | | 0 | 1 | 2 | 3 | 4 | 5 | 6 | 7 | 8 | 9 | D | U | S |
| 0 | 5 ms | D | S | U | U | U | D | S | U | U | U | 2 | 6 | 2 |
| 1 | 5 ms | D | S | U | U | D | D | S | U | U | D | 4 | 4 | 2 |
| 2 | 5 ms | D | S | U | D | D | D | S | U | D | D | 6 | 2 | 2 |
| 3 | 10 ms | D | S | U | U | U | D | D | D | D | D | 6 | 3 | 1 |
| 4 | 10 ms | D | S | U | U | D | D | D | D | D | D | 7 | 2 | 1 |
| 5 | 10 ms | D | S | U | D | D | D | D | D | D | D | 8 | 1 | 1 |
| 6 | 5 ms | D | S | U | U | U | D | S | U | U | D | 3 | 5 | 2 |

D    Downlink subframe

U    Uplink subframe

S    Special subframe

Fig. 5

| Uplink/Downlink configuration | PUCCH or HARQ-ACK in subframe number n | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7,6 | 4 | | | | 7,6 | 4 | |
| 2 | | | 8,7,4,6 | | | | | 8,7,4,6 | | |
| 3 | | | 7,6,11 | 6,5 | 5,4 | | | | | |
| 4 | | | 12,8,7,11 | 6,5,4,7 | | | | | | |
| 5 | | | 13,12,9,8,7,5,4,11,6 | | | | | | | |
| 6 | | | 7 | 7 | 5 | | | 7 | 7 | |

| 7 | PDSCH in subframe number n-k

Fig. 6

| Uplink/Downlink Configuration | PDCCH in subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4,7 | 6,7 | | | | 4,7 | 6,7 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

| 4 | PUSCH in subframe number n+k

TDD UPLINK/DOWNLINK RE-CONFIGURATION MECHANISM

TECHNICAL FIELD

The invention relates to methods for communication between a mobile station and a base station based on a flexible TDD uplink downlink configuration. The invention is also providing the mobile station and the base station for participating in the methods described herein.

BACKGROUND

Long Term Evolution (LTE)

Third-generation mobile systems (3G) based on WCDMA radio-access technology is being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g., parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE (Release 8)

The downlink component carrier of a 3GPP LTE (Release 8 and further) is subdivided in the time-frequency domain in so-called subframes. In 3GPP LTE (Release 8 and further) each subframe is divided into two downlink slots as shown in FIG. 3, wherein the first downlink slot comprises the control channel region (PDCCH region) within the first OFDM symbols. Each subframe consists of a give number of OFDM symbols in the time domain (12 or 14 OFDM symbols in 3GPP LTE, Release 8 and further), wherein each OFDM symbol spans over the entire bandwidth of the component carrier. The OFDM symbols thus each consists of a number of modulation symbols transmitted on respective $N_{RB}^{DL} \times N_{sc}^{RB}$ subcarriers as also shown in FIG. 4.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as $N_{symb}^{DL}$ consecutive OFDM symbols in the time domain (e.g., 7 OFDM symbols)

and $N_{sc}^{RB}$ consecutive subcarriers in the frequency domain as exemplified in FIG. 4 (e.g., 12 subcarriers for a component carrier). In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same $N_{sc}^{RB}$ consecutive subcarriers spanning a full subframe is called a "resource block pair", or equivalent "RB pair" or "PRB pair".

The term "component carrier" refers to a combination of several resource blocks in the frequency domain. In subsequent releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure apply to later releases too.

Logical and Transport Channels

The MAC layer provides a data transfer service for the RLC layer through logical channels. Logical channels are either Control Logical Channels which carry control data such as RRC signaling, or Traffic Logical Channels which carry user plane data. Broadcast Control Channel (BCCH), Paging Control channel (PCCH), Common Control Channel (CCCH), Multicast Control Channel (MCCH) and Dedicated Control Channel (DCCH) are Control Logical Channels. Dedicated Traffic channel (DTCH) and Multicast Traffic Channel (MTCH) are Traffic Logical Channels.

Data from the MAC layer is exchanged with the physical layer through Transport Channels. Data is multiplexed into transport channels depending on how it is transmitted over the air. Transport channels are classified as downlink or uplink as follows. Broadcast Channel (BCH), Downlink Shared Channel (DL-SCH), Paging Channel (PCH) and Multicast Channel (MCH) are downlink transport channels, whereas the Uplink Shared Channel (UL-SCH) and the Random Access Channel (RACH) are uplink transport channels.

A multiplexing is then performed between logical channels and transport channels in the downlink and uplink respectively.

Layer 1/Layer 2 (L1/L2) Control Signaling

In order to inform the scheduled users about their allocation status, transport format and other data-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH.

Generally, the information sent on the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;

Resource allocation information, indicating the resources (Resource Blocks, RBs) on which a user is allocated. Note, that the number of RBs on which a user is allocated can be dynamic;

Carrier indicator, which is used if a control channel transmitted on a first carrier assigns resources that concern a second carrier, i.e., resources on a second carrier or resources related to a second carrier;

Modulation and coding scheme that determines the employed modulation scheme and coding rate;

HARQ information, such as a new data indicator (NDI) and/or a redundancy version (RV) that is particularly useful in retransmissions of data packets or parts thereof;

Power control commands to adjust the transmit power of the assigned uplink data or control information transmission;

Reference signal information such as the applied cyclic shift and/or orthogonal cover code index, which are to be employed for transmission or reception of reference signals related to the assignment;

Uplink or downlink assignment index that is used to identify an order of assignments, which is particularly useful in TDD systems;

Hopping information, e.g., an indication whether and how to apply resource hopping in order to increase the frequency diversity;

CSI request, which is used to trigger the transmission of channel state information in an assigned resource; and Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in its fields. The different DCI formats that are currently defined for LTE are as follows and described in detail in 3GPP TS 36.212, "Multiplexing and channel coding", section 5.3.3.1 (available at http://www.3gpp.org and incorporated herein by reference). For further information regarding the DCI formats and the particular information that is transmitted in the DCI, please refer to the technical standard or to LTE—The UMTS Long Term Evolution—From Theory to Practice, Edited by Stefanie Sesia, Issam Toufik, Matthew Baker, Chapter 9.3, incorporated herein by reference.

Format 0: DCI Format 0 is used for the transmission of resource grants for the PUSCH, using single-antenna port transmissions in uplink transmission mode 1 or 2.

Format 1: DCI Format 1 is used for the transmission of resource assignments for single codeword PDSCH transmissions (downlink transmission modes 1, 2 and 7).

Format 1A: DCI Format 1A is used for compact signaling of resource assignments for single codeword PDSCH transmissions, and for allocating a dedicated preamble signature to a mobile terminal for contention-free random access.

Format 1B: DCI Format 1B is used for compact signaling of resource assignments for PDSCH transmissions using closed loop precoding with rank-1 transmission (downlink transmission mode 6). The information transmitted is the same as in Format 1A, but with the addition of an indicator of the precoding vector applied for the PDSCH transmission.

Format 1C: DCI Format 1C is used for very compact transmission of PDSCH assignments. When format 1C is used, the PDSCH transmission is constrained to using QPSK modulation. This is used, for example, for signaling paging messages and broadcast system information messages.

Format 1D: DCI Format 1D is used for compact signaling of resource assignments for PDSCH transmission using multi-user MIMO. The information transmitted is the same as in Format 1B, but instead of one of the bits of the precoding vector indicators, there is a single bit to indicate whether a power offset is applied to the data symbols. This feature is needed to show whether or not the transmission power is shared between two UEs. Future versions of LTE may extend this to the case of power sharing between larger numbers of UEs.

Format 2: DCI Format 2 is used for the transmission of resource assignments for PDSCH for closed-loop MIMO operation.

Format 2A: DCI Format 2A is used for the transmission of resource assignments for PDSCH for open-loop MIMO operation. The information transmitted is the same as for Format 2, except that if the eNodeB has two transmit antenna ports, there is no precoding information, and for four antenna ports two bits are used to indicate the transmission rank.

Format 2B: Introduced in Release 9 and is used for the transmission of resource assignments for PDSCH for dual-layer beamforming.

Format 2C: Introduced in Release 10 and is used for the transmission of resource assignments for PDSCH for closed-loop single-user or multi-user MIMO operation with up to 8 layers.

Format 2D: has been introduced in Release 11 and is used for up to 8 layer transmissions; mainly used for COMP (Cooperative Multipoint).

Format 3 and 3A: DCI formats 3 and 3A are used for the transmission of power control commands for PUCCH and PUSCH with 2-bit or 1-bit power adjustments respectively. These DCI formats contain individual power control commands for a group of UEs.

Format 4: DCI format 4 is used for the scheduling of the PUSCH, using closed-loop spatial multiplexing transmissions in uplink transmission mode 2.

The following table gives an overview of some available DCI formats and the typical number of bits, assuming for illustration purposes a system bandwidth of 50 RBs and four antennas at the eNodeB. The number of bits indicated in the right column include the bits for the CRC of the particular DCI.

TABLE

DCI Formats

| DCI format | Purpose | Number of bits including CRC |
|---|---|---|
| 0 | PUSCH grants | 43 |
| 1 | PDSCH assignments with a single codeword | 47 |
| 1A | PDSCH assignments using a compact format | 43 |
| 1B | PDSCH assignments for rank-1 transmission | 46 |
| 1C | PDSCH assignments using a very compact format | 29 |
| 1D | PDSCH assignments for multi-user MIMO | 46 |
| 2 | PDSCH assignments for closed-loop MIMO operation | 62 |
| 2A | PDSCH assignments for open-loop MIMO operation | 58 |
| 2B | PDSCH assignments for dual-layer beamforming | 57 |
| 2C | PDSCH assignments for closed-loop single-user or multiuser MIMO operation | 58 |
| 2D | PDSCH assignments for closed-loop single-user or multi-user MIMO operation, COMP | 61 |
| 3 | Transmit Power Control (TPC) commands for multiple users for PUCCH and PUSCH with 2-bit power adjustments | 43 |
| 3A | Transmit Power Control (TPC) commands for multiple users for PUCCH and PUSCH with 1-bit power adjustments | 43 |
| 4 | PUSCH grants | 52 |

In order that the UE can identify whether it has received a PDCCH transmission correctly, error detection is provided by means of a 16-bit CRC appended to each PDCCH (i.e., DCI). Furthermore, it is necessary that the UE can identify which PDCCH(s) are intended for it. This could in theory be achieved by adding an identifier to the PDCCH payload; however, it turns out to be more efficient to scramble the CRC with the "UE identity", which saves the additional overhead. The CRC may be calculated and scrambled as defined in detail by 3GPP in TS 36.212, Section 5.3.3.2 "CRC attachment", incorporated hereby by reference. The section describes how error detection is provided on DCI transmissions through a Cyclic Redundancy Check (CRC). A brief summary is given below.

The entire payload is used to calculate the CRC parity bits. The parity bits are computed and attached. In the case where UE transmit antenna selection is not configured or applicable, after attachment, the CRC parity bits are scrambled with the corresponding RNTI.

The scrambling may further depend on the UE transmit antenna selection, as apparent from TS 36.212. In the case where UE transmit antenna selection is configured and applicable, after attachment, the CRC parity bits are scrambled with an antenna selection mask and the corresponding RNTI. As in both cases the RNTI is involved in the scrambling operation, for simplicity and without loss of generality the following description of the embodiments simply refers to the CRC being scrambled (and descrambled, as applicable) with an RNTI, which should therefore be understood as notwithstanding, e.g., a further element in the scrambling process such as an antenna selection mask.

Correspondingly, the UE descrambles the CRC by applying the "UE identity" and, if no CRC error is detected, the UE determines that PDCCH carries its control information intended for itself. The terminology of "masking" and "de-masking" is used as well, for the above-described process of scrambling a CRC with an identity.

The "UE identity" mentioned above with which the CRC of the DCI may be scrambled can also be a SI-RNTI (System Information Radio Network Temporary Identifier), which is not a "UE identity" as such, but rather an identifier associated with the type of information that is indicated and transmitted, in this case the system information. The SI-RNTI is usually fixed in the specification and thus known a priori to all UEs.

There are various types of RNTIs that are used for different purposes. The following tables taken from 3GPP 36.321 Chapter 7.1 shall give an overview of the various 16-bits RNTIs and their usages.

TABLE

RNTIs

| Value (hexa-decimal) | RNTI |
| --- | --- |
| 0000 | N/A |
| 0001-003C | RA-RNTI, C-RNTI, Semi-Persistent Scheduling C-RNTI, Temporary C-RNTI, TPC-PUCCH-RNTI and TPC-PUSCH-RNTI (see note) |
| 003D-FFF3 | C-RNTI, Semi-Persistent Scheduling C-RNTI, Temporary C-RNTI, TPC-PUCCH-RNTI and TPC-PUSCH-RNTI |
| FFF4-FFFC | Reserved for future use |
| FFFD | M-RNTI |
| FFFE | P-RNTI |
| FFFF | SI-RNTI |

Physical Downlink Control Channel (PDCCH) and Physical Downlink Shared Channel (PDSCH)

The physical downlink control channel (PDCCH) carries, e.g., scheduling grants for allocating resources for downlink or uplink data transmission. Multiple PDCCHs can be transmitted in a subframe.

The PDCCH for the user equipments is transmitted on the first $N_{symb}^{PDCCH}$ OFDM symbols (usually either 1, 2 or 3 OFDM symbols as indicated by the PCFICH, in exceptional cases either 2, 3, or 4 OFDM symbols as indicated by the PCFICH) within a subframe, extending over the entire system bandwidth; the system bandwidth is typically equivalent to the span of a cell or component carrier. The region occupied by the first $N_{symb}^{PDCCH}$ OFDM symbols in the time domain and the $N_{RB}^{DL} \times N_{sc}^{RB}$ subcarriers in the frequency domain is also referred to as PDCCH region or control channel region. The remaining $N_{symb}^{PDSCH} = 2 \cdot N_{symb}^{DL} - N_{symb}^{PDCCH}$ OFDM symbols in the time domain on the $N_{RB}^{DL} \times N_{sc}^{RB}$ subcarriers in the frequency domain is referred to as the PDSCH region or shared channel region (see below).

For a downlink grant (i.e., resource assignment) on the physical downlink shared channel (PDSCH), the PDCCH assigns a PDSCH resource for (user) data within the same subframe. The PDCCH control channel region within a subframe consists of a set of CCE where the total number of CCEs in the control region of subframe is distributed throughout time and frequency control resource. Multiple CCEs can be combined to effectively reduce the coding rate of the control channel. CCEs are combined in a predetermined manner using a tree structure to achieve different coding rate.

On a transport channel level, the information transmitted via the PDCCH is also referred to as L1/L2 control signaling (for details on L1/L2 control signaling see above).

There is a particular predefined timing relation between uplink resource assignments received in a subframe and the corresponding uplink transmission in PUSCH.

Details are given in TS 36.213 v11.1.0 "3rd Generation Partnership Project; Technical Specification Group Radio Access Network; Evolved Universal Terrestrial Radio Access (E-UTRA); Physical layer procedures (Release 11)" Chapter 8.0 "UE procedure for transmitting the physical uplink shared channel" incorporated herewith by reference.

In particular, Table 8-2 of TS 36.213 which is reproduced in FIG. 7 defines the parameter k for the TDD configurations 0-6, where k indicates the positive offset of the target of an uplink resource allocation received in a subframe; for TDD configuration 0 there is additional definition of the timing for uplink subframes 3 and 8, omitted herewith for simplicity. For instance, the parameter k is 6 for subframe 1 of TDD configuration 1, meaning that an uplink resource allocation received in subframe 1 of TDD configuration 1 is intended for subframe 1+6=7 of TDD configuration 1, which indeed is an uplink subframe, etc.

Hybrid ARO Schemes

A common technique for error detection and correction in packet transmission systems over unreliable channels is called hybrid Automatic Repeat request (HARQ). Hybrid ARQ is a combination of Forward Error Correction (FEC) and ARQ.

If a FEC encoded packet is transmitted and the receiver fails to decode the packet correctly (errors are usually checked by a CRC (Cyclic Redundancy Check)), the receiver requests a retransmission of the packet. Generally (and throughout this document) the transmission of additional information is called "retransmission (of a packet)", although this retransmission does not necessarily mean a transmission of the same encoded information, but could also mean the transmission of any information belonging to the packet (e.g., additional redundancy information).

Depending on the information (generally code-bits/symbols), of which the transmission is composed, and depending on how the receiver processes the information, the following Hybrid ARQ schemes are defined:

In Type I HARQ schemes, the information of the encoded packet is discarded and a retransmission is requested, if the receiver fails to decode a packet correctly. This implies that all transmissions are decoded separately. Generally, retransmissions contain identical information (code-bits/symbols) to the initial transmission.

In Type II HARQ schemes, a retransmission is requested, if the receiver fails to decode a packet correctly, where the receiver stores the information of the (erroneously received) encoded packet as soft information (soft-bits/symbols). This implies that a soft-buffer is required at the receiver. Retransmissions can be composed out of identical, partly identical or non-identical information (code-bits/symbols) according to the same packet as earlier transmissions. When receiving a retransmission the receiver combines the stored information from the soft-buffer and the currently received information and tries to decode the packet based on the combined information. (The receiver can also try to decode the transmission individually, however generally performance increases when combining transmissions.) The combining of transmissions refers to so-called soft-combining, where multiple received code-bits/symbols are likelihood combined and solely received code-bits/symbols are code combined. Common methods for soft-combining are Maximum Ratio Combining (MRC) of received modulation symbols and log-likelihood-ratio (LLR) combining (LLR combing only works for code-bits).

Type II schemes are more sophisticated than Type I schemes, since the probability for correct reception of a packet increases with every received retransmission. This increase comes at the cost of a required hybrid ARQ soft-buffer at the receiver. This scheme can be used to perform dynamic link adaptation by controlling the amount of information to be retransmitted. e.g., if the receiver detects that decoding has been "almost" successful, it can request only a small piece of information for the next retransmission (smaller number of code-bits/symbols than in previous transmission) to be transmitted. In this case it might happen that it is even theoretically not possible to decode the packet correctly by only considering this retransmission by itself (non-self-decodable retransmissions).

Type III HARQ schemes may be considered a subset of Type II schemes: In addition to the requirements of a Type II scheme each transmission in a Type III scheme must be self-decodable.

Synchronous HARQ means that the re-transmissions of HARQ blocks occur at pre-defined periodic intervals. Hence, no explicit signaling is required to indicate to the receiver the retransmission schedule.

Asynchronous HARQ offers the flexibility of scheduling re-transmissions based on air interface conditions. In this case some identification of the HARQ process needs to be signaled in order to allow for a correct combining and protocol operation. In 3GPP LTE systems, HARQ operations with eight processes are used. The HARQ protocol operation for downlink data transmission will be similar or even identical to HSDPA.

In uplink HARQ protocol operation there are two different options on how to schedule a retransmission. Retransmissions are either "scheduled" by a NACK (also referred to as a synchronous non-adaptive retransmission) or are explicitly scheduled by the network by transmitting a PDCCH (also referred to as synchronous adaptive retransmissions). In case of a synchronous non-adaptive retransmission the retransmission will use the same parameters as the previous uplink transmission, i.e., the retransmission will be signaled on the same physical channel resources, respectively uses the same modulation scheme/transport format.

Since synchronous adaptive retransmissions are explicitly scheduled via PDCCH, the eNodeB has the possibility to change certain parameters for the retransmission. A retransmission could be for example scheduled on a different frequency resource in order to avoid fragmentation in the uplink, or eNodeB could change the modulation scheme or alternatively indicate to the user equipment what redundancy version to use for the retransmission. It should be noted that the HARQ feedback (ACK/NACK) and PDCCH signaling occurs at the same timing. Therefore the user equipment only needs to check once whether a synchronous non-adaptive retransmission is triggered (i.e., only a NACK is received) or whether eNode B requests a synchronous adaptive retransmission (i.e., PDCCH is signaled).

HARQ and Control Signaling for TDD Operation

As explained above, transmission of downlink or uplink data with HARQ requires that ACKnowledgements (ACK or Negative ACK) be sent in the opposite direction to inform the transmitting side of the success or failure of the packet reception.

In case of FDD operation, acknowledgement indicators related to data transmission in a subframe n are transmitted in the opposite direction during subframe n+4, such that a one-to-one synchronous mapping exists between the instant at which the transport is transmitted and its corresponding acknowledgment. However, in the case of TDD operation, subframes are designated on a cell-specific basis as uplink or downlink or special (see next chapter), thereby constraining the times at which resource grants, data transmissions, acknowledgments and retransmissions can be sent in their respective directions. The LTE design for TDD therefore supports grouped ACK/NACK transmission to carry multiple acknowledgements within one subframe.

For uplink HARQ, the sending (in one downlink subframe) of multiple acknowledgements on the Physical Hybrid ARQ Indicator CHannel (PHICH) is not problematic since, when viewed from the eNodeB, this is not significantly different from the case in which single acknowledgements are sent simultaneously to multiple UEs. However, for downlink HARQ, if the asymmetry is downlink-biased, the uplink control signaling (PUCCH) formats of FDD are insufficient to carry the additional ACK/NACK information. Each of the TDD subframe configurations in LTE (see below, and FIG. 5) has its own such mapping predefined between downlink and uplink subframes for HARQ purposes, with the mapping being designed to achieve a balance between minimization of acknowledgment delay and an even distribution of ACK/NACKs across the available uplink subframes. Further details are provided in TS 36.213 v11.1.0 "3rd Generation Partnership Project; Technical Specification Group Radio Access Network; Evolved Universal Terrestrial Radio Access (E-UTRA); Physical layer procedures (Release 11)" Chapter 7.3 incorporated herewith by reference.

TS 36.213 v11.1.0 "3rd Generation Partnership Project; Technical Specification Group Radio Access Network; Evolved Universal Terrestrial Radio Access (E-UTRA); Physical layer procedures (Release 11)" Chapter 10.1.3, incorporated herein by reference explains the TDD HARQ-ACK feedback procedure.

Table 10.1.3-1 of TS 36.213 which is reproduced in FIG. 6 gives the downlink association set index for the ACK/NACK/DTX responses for the subframes of a radio frame, wherein the number in the boxes for the TDD configurations indicates the negative offset of the subframe which HARQ feedback is transported in said subframe. For instance, subframe 9 for TDD configuration 0 transports the HARQ feedback of subframe 9−4=5; subframe 5 of TDD configuration 0 being indeed a downlink subframe (see FIG. 5).

In HARQ operation, the eNB can transmit different coded version from the original TB in retransmissions so that the UE can employ incremental redundancy (IR) combining [8] to get additional coding gain over the combining gain. However in realistic systems, it is possible that the eNB transmits a TB to one specific UE on one resource segment, but the UE cannot detect the data transmission due to DL control information lost. In this case, IR combining will lead to very poor performance for decoding the retransmissions because the systematic data has not been available at the UE. To mitigate this problem the UE should feed back a third state, namely discontinuous transmission (DTX) feedback, to indicate that no TB is detected on the associated resource segment (which is different from NACK indicating the decoding failure).

Time Division Duplex—TDD

LTE can operate in Frequency-Division-Duplex (FDD) and Time-Division-Duplex (TDD) modes in a harmonized framework, designed also to support the evolution of TD-SCDMA (Time-Division Synchronous Code Division Multiple Access). TDD separates the uplink and downlink transmissions in the time domain, while the frequency may stay the same.

The term "duplex" refers to bidirectional communication between two devices, distinct from unidirectional communication. In the bidirectional case, transmissions over the link in each direction may take place at the same time ("full duplex") or at mutually exclusive times ("half duplex").

For TDD in the unpaired radio spectrum, the basic structure of RBs and REs is depicted in FIG. 4, but only a subset of the subframes of a radio frame are available for downlink transmissions; the remaining subframes are used for uplink transmissions, or for special subframes. Special subframes are important to allow uplink transmission timings to be advanced, so as to make sure that transmitted signals from the UEs (i.e., uplink) arrive roughly at the same time at the eNodeB. Since the signal propagation delay is related to the distance between transmitter and receiver (neglecting reflection and other similar effects), this means that a signal transmitted by a UE near the eNodeB travels for a short time than the signals transmitted by a UE far from the eNodeB. In order to arrive at the same time, the far UE has to transmit its signal earlier than the near UE, which is solved by the so-called "timing advance" procedure in 3GPP systems.

In TDD this has the additional circumstance that the transmission and reception occur on the same carrier frequency, i.e., downlink and uplink need to be duplexed in time domain. While a UE far from the eNodeB needs to start uplink transmission earlier than the near UE, conversely, a downlink signal is received by a near UE earlier than by the far UE. In order to be able to switch the circuitry from DL reception to UL transmission, guard time is defined in the special subframe. To additionally take care of the timing advance problem, the guard time for a far UE needs to be longer than for a near UE.

This TDD structure is known as "Frame Structure Type 2" in 3GPP LTE Release 8 and later, of which seven different uplink-downlink configurations are defined, which allow a variety of downlink-uplink ratios and switching periodicities. FIG. 5 illustrates the Table with the 7 different TDD uplink-downlink configurations, indexed from 0-6, where "D" shall indicate a downlink subframe, "U" an uplink subframe and "S" a special subframe. As can be seen therefrom, the seven available TDD uplink-downlink configurations can provide between 40% and 90% of downlink subframes (when, for simplicity, counting a special subframe as a downlink subframe, since part of such a subframe is available for downlink transmission).

FIG. 5 shows the frame structure type 2, particularly for a 5 ms switch-point periodicity, i.e., for TDD configurations 0, 1, 2 and 6.

FIG. 8 illustrates a radio frame, being 10 ms in length, and the corresponding two half-frames of 5 ms each. The radio frame consists of 10 subframes with each 1 ms, where each of the subframes is assigned the type of uplink, downlink or special, as defined by one of the Uplink-downlink configurations according to the table of FIG. 5.

As can be appreciated from FIG. 5, subframe #1 is always a Special subframe, and subframe #6 is a Special subframe for TDD configurations 0, 1, 2 and 6; for TDD configurations 3, 4 and 5, subframe #6 is destined for downlink. Special subframes include three fields: DwPTS (Downlink Pilot Time Slot), the GP (Guard Period) and UpPTS (Uplink Pilot Time Slot). The following Table shows information on the special subframe and in particular lists the lengths of DwPTS (Downlink Pilot Time Slot), the GP (Guard Period) and of UpPTS (Uplink Pilot Time Slot) as a multiple of the sample time $T_s=(1/30720)$ ms as defined for 3GPP LTE Release 11.

TABLE special subframe configurations, Frame Structure Type 2

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

The TDD configuration applied in the system has an impact on many operations performed at the mobile station and base station, such as radio resource management (RRM) measurements, channel state information (CSI) measurements, channel estimations, PDCCH detection and HARQ timings.

In particular, the UE reads the system information to learn about the TDD configuration in its current cell, i.e., which subframe to monitor for measurement, for CSI measure and report, for time domain filtering to get channel estimation, for PDCCH detection, or for UL/DL ACK/NACK feedback.

Shortcoming of Current Semi-Static TDD UL/DL Configuration Scheme

The current mechanism for adapting UL-DL allocation is based on the system information acquisition procedure or the system information change procedure, where the particular UL-DL TDD configuration is indicated by a SIB, in this case/specifically by the TDD-config parameter in SIB1 (for details on the broadcast of system information, 3GPP TS 25.331, "Radio Resource Control (RRC)", version 6.7.0, section 8.1.1, incorporated herein by reference).

In the system information change procedure as specified in LTE Release 8, the supported time scale for a TDD UL/DL re-configuration is every 640 ms or longer. When re-using the ETWS (Earthquake and Tsunami Warning System), the supported time scale for UL-DL TDD re-configuration is every 320 ms or longer depending on the configured default paging cycle.

Nevertheless, the semi-static allocation of TDD UL/DL configuration may or may not reflect the instantaneous traffic situation. In case of rapid changes between an uplink-dominated to a downlink-dominated traffic situation, the system information change procedure is too slow for a dynamic TDD UL/DL re-configuration. Accordingly, the semi-static TDD UL/DL re-configuration is too slow to maximize the subframe utilization with respect to the instantaneous traffic situation.

In this respect, a dynamic TDD UL/DL re-configuration has been widely discussed in connection with LTE Release 12. The dynamic TDD UL/DL re-configuration is anticipated to adapt the TDD.UL/DL configuration to the current traffic needs, for instance, to dynamically create more downlink subframes to increase the downlink bandwidth or to dynamically create more blank uplink subframes in order to mitigate interference to communications, e.g., in uplink or downlink or to/from a neighboring cell.

In particular, LTE Release 12 will support an explicit signaling for the dynamic TDD UL/DL re-configuration. For this purpose, various signaling mechanisms are currently discussed. These signaling mechanisms shall enable instantaneous distribution of information on the TDD UL/DL re-configuration within the communication system and shall allow the mobile station/base station to re-configure the TDD UL/DL configuration without delay.

It turns out that currently employed RRC signaling mechanisms cannot ensure short TDD UL/DL re-configuration intervals as required to meet the needs of a dynamic TDD UL/DL re-configuration. In this respect, it is currently expected that a DCI signaling mechanism will be defined to allow for the dynamic TDD UL/DL re-configuration. The re-configuration is assumed to be valid for at least one radio frame (i.e., 10 ms).

With the above defined system constraints, the dynamic TDD UL/DL re-configuration will have to overcome incompatibilities between DCI to PUSCH timing relations as well as PDSCH to HARQ-ACK timing relations that are defined for each of the TDD configurations.

As already described earlier, for each TDD configuration 0-6 a timing relation is defined between an uplink resource allocation (e.g., UL grant) in a DCI format 0/4 message and the corresponding target PUSCH transmission in an uplink subframe. Specifically, the DCI to PUSCH timing relation allows for target PUSCH transmissions to be scheduled that are overlapping radio frame boundaries. In other words, a PUSCH transmission and the relating DCI transmission may take place in different radio frames. For example, according to TDD configuration 6, a PUSCH transmission in subframe 2 in one radio frame relates to a DCI transmission that has taken place in the previous radio frame.

Similarly, for each TDD configuration 0-6 a timing relation is defined between one or plural PDSCH transmissions and one or plural subsequent Hybrid ARQ-ACK transmissions. Also the PDSCH to HARQ-ACK timing relation allows for HARQ-ACK transmissions overlapping radio frame boundaries. In other words, a HARQ-ACK transmission and the relating PDSCH transmission may take place in different radio frames. For example, according to TDD configuration 5, HARQ-ACK transmissions in subframe 2 for one radio frame relates to PDSCH transmissions that have taken place in the previous two radio frames.

In this respect, for a TDD UL/DL re-configuration between subsequent subframes the application of the corresponding DCI to PUSCH timing relations does not allow for a continuous resource allocation of all supported uplink subframes. The inconsistencies in the uplink resource allocation shall be exemplified for the case where the UL grant is in a DCI transmission that is transmitted before the TDD re-configuration takes effect and the PUSCH transmission relating to the DCI transmission is scheduled after the TDD re-configuration takes effect.

Exemplarily, a TDD UL/DL re-configuration from TDD configuration 3 to TDD configuration 6 is illustrated in FIG. 9A. For each of the TDD configuration 3 and TDD configuration 6, the DCI to PUSCH timing relations are indicated by dash-dotted arrows. Accordingly, for allocation of a PUSCH transmission (i.e., uplink transmission) in a subframe which supports uplink transmissions, a DCI transmission relating to the respective PUSCH transmission is indicated as the origin of the dash-dotted arrow.

However, due to the TDD UL/DL re-configuration from TDD configuration 3 to TDD configuration 6, a PUSCH transmission in the subframe with index 24 is not possible. In particular, the TDD configuration 6, which is to be used after the TDD UL/DL re-configuration takes effect (i.e., from and including the subframe with the index 20 onward), does not, in the DCI to PUSCH timing relation of TDD configuration 6, allow for a DCI transmission that could result in PUSCH transmission in the subframe with index 24. In FIG. 9A, this can be seen by the absence of arrow(s) terminating at the PUSCH of subframe 24.

Even when assuming that PUSCH transmissions relating to DCI transmission before the TDD UL/DL re-configuration are to be carried out after the TDD UL/DL re-configuration, as for example indicated for the PUSCH transmission in the subframes with index 22 and 23, there is no possibility of a DCI transmission that would result in the scheduling of a PUSCH transmission in the subframe with index 24.

Another example for the TDD UL/DL re-configuration from the TDD configuration 0 to TDD configuration 6 is illustrated in FIG. 10. Also in this example, there is no possibility of a DCI transmission that would result in the scheduling of a PUSCH transmission in the subframe with index 24.

Consequently, due to the DCI to PUSCH timing relation being predefined for each TDD configuration, the uplink bandwidth cannot be immediately utilized after TDD UL/DL re-configuration.

Further exemplarily, a TDD UL/DL re-configuration from TDD configuration 3 to TDD configuration 6 is also illustrated in FIG. 9B. For each of the TDD configuration 3 and the TDD configuration 6 the PDSCH to HARQ-ACK timing relations are indicated by dash-dotted arrows. Accordingly, for HARQ-ACK transmissions in a subframe which supports uplink transmissions, PDSCH transmissions relating to the respective HARQ-ACK transmissions are indicated as the origin of the dash-dotted arrow.

However, due to the TDD UL/DL re-configuration from TDD configuration 3 to TDD configuration 6, a HARQ-ACK transmission for the PDSCH transmissions in the subframe with indexes 11, 17 and 18 is not possible. In particular, the TDD configuration 6, which is to be used after the TDD UL/DL re-configuration takes place (i.e., from and including the subframe with the index 20 onward), does not, in the PDSCH to HARQ-ACK timing relation of TDD configuration 6, allow for HARQ-ACK transmissions relating to the PDSCH transmissions in the subframe with indexes 11, 17 and 18.

Even when assuming, that HARQ-ACK transmissions relating to PDSCH transmissions before the TDD UL/DL re-configuration are to be carried out after the TDD UL/DL re-configuration, as for example indicated for the HARQ-ACK transmissions relating to the PDSCH transmission in the subframes with index 15, 16 and 19, there is no possibility of HARQ-ACK transmissions that would acknowledge the PDSCH transmissions in the subframe with indexes 11, 17 and 18.

Consequently, due to the PDSCH to HARQ-ACK timing relation being predefined for each TDD configuration, the allocated Hybrid ARQ functionality cannot be immediately utilized after TDD UL/DL re-configuration.

In recent 3GPP LTE meetings various approaches were discussed for TDD UL/DL re-configuration. Specifically, it was proposed to separately define reference configurations for the DCI to PUSCH timing relations as well as the PDSCH to HARQ-ACK timing relations that would have to be continuously applied after TDD UL/DL re-configuration. Exemplarily, even though SIB1 TDD configuration is operated an UE would continuously apply the timing relation specified in the newly defined reference configuration.

However, these approaches have the following drawbacks: Firstly, an additional higher layer configuration is required. Secondly, reference configuration timing relations would have to be applied even if they are not (e.g., no longer) required.

In the exemplary case of the SIB1 TDD configuration, this results in unnecessarily long delays for some HARQ-ACK transmissions, in an unnecessary long delays between DCI an PUSCH transmissions from some TDD configurations, and in an unnecessary bundling/multiplexing of HARQ-ACK transmissions into a few PUCCH subframes.

BRIEF SUMMARY

One object of the invention is to provide for an improved Time Division Duplex re-configuration operation, that solves the problems of the prior art as discussed above.

The object is solved by the subject matter of the independent claims. Advantageous embodiments are subject to the dependent claims.

The various embodiments of the invention are based on the concept that for a TDD UL/DL re-configuration the DCI to PUSCH and/or to PDSCH to HARQ-ACK timing relations are to be applied differently (i.e., separately) from the TDD radio frame configuration. This distinction between the TDD radio frame configuration and the timing relations is only to take place during a short period of time before and/or after the re-configuration takes effect.

In particular, predefined TDD radio frame configurations or TDD configurations define the reservation of subframes within a radio frame as downlink (abbreviated "D"), uplink (abbreviated "U"), or special (abbreviated "S") subframes. In this respect, in the event of a TDD UL/DL re-configuration, a source TDD configuration defines the reservation of subframes before the re-configuration takes effect and a target TDD configuration defines the reservation of subframes after the re-configuration takes effect.

It is important to note here that the reservation for downlink or uplink only serves to indicate the transmission/reception direction (i.e., downlink for transmissions from a base station to mobile stations, uplink for transmissions from mobile stations to a base station), and does not necessarily imply that such a transmission (e.g., on PDSCH for D subframes or on PUSCH for U subframes) actually occurs. In this respect, uplink transmissions can occur only in U subframes (or the UpPTS part of an S subframe), but not every U (or UpPTS part of an S) subframe necessarily carries an uplink transmission. Likewise, downlink transmissions can occur only in D subframes (or the DwPTS part of an S subframe), but not every D (or DwPTS part of an S) subframe necessarily carries a downlink transmission.

Exemplarily, in the event of a TDD UL/DL re-configuration from source TDD configuration 3 to target TDD configuration 6, the source TDD configuration 3 defines the reservation of the subframes within radio frames before the re-configuration takes effect, and the target TDD configuration 6 defines the reservation of the subframes with radio frames after the re-configuration. In this respect, the TDD communication scheme utilizes the TDD configuration pattern "D, S, U, U, U, D, D, D, D, D" before and the TDD configuration pattern "D, S, U, U, U, D, S, U, U, D" after the re-configuration takes effect.

According to the invention, the DCI to PUSCH timing relations and/or the PDSCH to HARQ-ACK timing relations are applied differently from the source/target TDD configuration during a time period before and/or after the TDD UL/DL re-configuration takes effect. In other words, even though each source/target TDD configuration prescribes a DCI to PUSCH timing relation and/or a PDSCH to HARQ-ACK timing relation, according to the invention this prescribed rule is broken for a short period of time before and/or after the TDD UL/DL re-configuration takes effect.

In particular, the term "DCI to PUSCH timing relation" defines when (i.e., during which subframe) PUSCH transmissions relating to DCI transmissions have to be carried out. Particularly, since PUSCH transmissions require preceding UL grants, the DCI transmissions, to which PUSCH transmissions relate, inherently are DCI transmissions carrying an UL grant. In other words, in LTE Release 11 the corresponding DCI transmissions are of Format 0/4.

Similarly, the term "PDSCH to HARQ-ACK timing relation" defines when (i.e., during which subframe) HARQ-ACK transmissions relating to PDSCH transmissions have to be carried out. In the context of the invention, the term "HARQ-ACK transmission" refers to the transmission of ACK/NACK/DTX information related to one PDSCH transmission. In this respect, in case the following description should state that no HARQ-ACK transmission is carried out in subframe O which relates to PDSCH transmission in subframe P, this should be interpreted in the sense that potential HARQ-ACK transmissions in subframe O do not include ACK/NACK/DTX information related to PDSCH transmission P. In other words, it is possible that HARQ-ACK transmissions occur in subframe O for PDSCH transmissions in subframes other than subframe P.

According to the invention, during the TDD UL/DL re-configuration the timing relations that are predefined for TDD configurations and relate to DCI to PUSCH and/or to PDSCH to HARQ-ACK are to be applied differently from the TDD radio frame configuration in order to improve the uplink bandwidth utilization and/or to enable Hybrid ARQ functionality, respectively.

According to a first aspect of the invention, a communication between a mobile station and a base station in a communication system is defined employing the improved TDD UL/DL re-configuration. The communication is re-configured from a source TDD configuration to a target TDD configuration.

The source TDD configuration is one out of a subset of a plurality of pre-configured TDD configurations. For example, the source TDD configuration is one out of the subset of TDD configurations 1-6, where the plurality of TDD configurations includes TDD configurations 0-6. The target TDD configuration is any one out of the plurality of pre-configured TDD configurations, for example any one out of TDD configurations 0-6.

In the event that the communication between the mobile station and the base station is to be re-configured for a predetermined subframe N at the beginning of a radio frame, the subframes before subframe N where the re-configuration takes effect is configured based on the source TDD configuration whereas the subframes from and including subframe N onward are configured based on the target TDD configuration.

Additionally, in case the mobile station detects one or plural Downlink Control Information, DCI, transmission(s) carrying an UL grant(s), the mobile station performs one or plural Physical Uplink Shared Channel, PUSCH, transmissions in response to the detected DCI transmission(s) according to the following scheme:

For PUSCH transmissions relating to DCI transmissions that were received by the mobile station up to and including subframe N−6, the mobile station applies the source TDD configuration. Specifically, the mobile station applies the timing relation defined by the source TDD configuration for one or plural PUSCH transmission(s) that are scheduled in response to the one or plural DCI transmission(s) carrying the respective UL grant received during same subframes, thereby determining when the one or plural PUSCH transmission(s) occur.

For PUSCH transmissions relating to DCI transmissions that were received by the mobile station during and including subframe N−5 to and including subframe N−1, the mobile station applies an intermediate (i.e., predefined) TDD configuration. Specifically, the mobile station applies the timing relation defined by the intermediate (i.e., predefined) TDD configuration for the one or plural PUSCH transmission(s) that are scheduled in response to the one or plural DCI transmission(s) carrying the respective UL grant received during same subframes, thereby determining when the one or plural PUSCH transmission(s) occur.

For PUSCH transmissions relating to DCI transmissions that were received by the mobile station from and including subframe N onward, the mobile station applies the target TDD configuration. Specifically, the mobile station applies the timing relation defined by the target TDD configuration for the one or plural PUSCH transmission(s) that are scheduled in response to the one or plural DCI transmission(s) carrying the respective UL grant received during same subframes, thereby determining when the one or plural PUSCH transmission(s) occur.

The intermediate (i.e., predefined) TDD configuration is one out of the plurality of pre-configured TDD configurations, for example any one out of TDD configurations 0-6.

In particular, due to the application of the intermediate (i.e., predefined) TDD configuration to PUSCH transmission(s) relating to the DCI transmissions immediately before the TDD UL/DL re-configuration (and thereby the target TDD configuration) takes effect, the uplink bandwidth utilization within the communication system can be improved.

According to a second aspect of the invention a communication between a mobile station and a base station in a communication system is specified employing a differently improved TDD UL/DL re-configuration. The communication is re-configured from a source TDD configuration to a target TDD configuration.

The source TDD configuration is a predefined one out of a plurality of pre-configured TDD configurations. For example, the source TDD configuration is TDD configuration 0. The target TDD configuration is any one out of the plurality of pre-configured TDD configurations, for example any one out of TDD configurations 0-6.

In the event that the communication between the mobile station and the base station is to be re-configured for a predetermined subframe N at the beginning of the subframe, the radio frames before subframe N where the re-configuration takes effect are configured based on the source TDD configuration whereas the radio frames from and including subframe N onward are configured based on the target TDD configuration.

Further, in case the mobile station detects one or plural Downlink Control Information, DCI, transmission(s) carrying UL grant(s), the mobile station performs one or plural Physical Uplink Shared Channel, PUSCH, transmissions in response to the detected DCI transmission(s) according to the following scheme:

For PUSCH transmissions relating to DCI transmissions that were received by the mobile station up to and including subframe N, the mobile station applies the source TDD configuration. Specifically, the mobile station applies the timing relation defined by the source TDD configuration for one or plural PUSCH transmission(s) that are scheduled in response to the one or plural DCI transmission(s) carrying the respective UL grant received during same subframes.

For PUSCH transmissions relating to DCI transmissions that were received by the mobile station from and including subframe N+1 onward, the mobile station applies the target TDD configuration. Specifically, the mobile station applies the timing relation defined by the target TDD configuration for the one or plural PUSCH transmission(s) that are scheduled in response to the one or plural DCI transmission(s) carrying the respective UL grant received during same subframes.

In particular, due to the application of the target TDD configuration to a PUSCH transmission relating to a DCI transmission received immediately after the TDD UL/DL re-configuration takes effect (i.e., subframe N), the uplink bandwidth utilization within the communication system can be improved.

According to a third aspect of the invention, a communication between a mobile station and a base station in a communication system is specified employing another improved TDD UL/DL re-configuration. The communication is re-configured from a source TDD configuration to a target TDD configuration.

The source and the target uplink/downlink configurations are out of a plurality of TDD configurations. For example, the source and the target TDD configurations are any one out of the plurality of pre-configured TDD configurations 0-6.

In the event that the communication between the mobile station and the base station is to be re-configured for a predetermined subframe N at the beginning of the subframe, the radio frames before subframe N where the re-configuration takes effect are configured based on the source TDD configuration, whereas the radio frames from and including subframe N onward are configured based on the target TDD configuration.

Further, in case the mobile station is to perform Hybrid ARQ-ACK transmissions in response to Physical Downlink Shared Channel, PDSCH, transmissions, the mobile station performs the HARQ-ACK transmissions according to the following scheme:

For Hybrid ARQ-ACK transmissions that are to be transmitted by the mobile station up to and including subframe N−1, the mobile station applies the source TDD configuration. Specifically, the mobile station applies, during same subframes, the timing relation defined by the source TDD configuration for one or plural HARQ-ACK transmission(s) that are to be transmitted in response to the one or plural PDSCH transmission(s) previously received by the mobile station.

For Hybrid ARQ-ACK transmissions that are to be sent by the mobile station during subframes N+1 to N+12, the mobile station applies another intermediate (i.e., predefined) TDD configuration. Specifically, the mobile station applies, during same subframes, the timing relation defined by the other intermediate (i.e., predefined) TDD configuration for the one or plural HARQ-ACK transmission(s) that that are to be transmitted in response to the one or plural PDSCH transmission(s) previously received by the mobile station. The other intermediate TDD configuration is one of out of the plurality of TDD configurations.

For Hybrid ARQ-ACK transmissions that are to be sent by the mobile station from and including subframe N+13 onward, the mobile station applies the target TDD configuration. Specifically, the mobile station applies, during same subframes, the timing relation defined by the target TDD configuration for the one or plural HARQ-ACK transmission(s) that that are to be transmitted in response to the one or plural PDSCH transmission(s) previously received by the mobile station.

In particular, due to the application of the other intermediate (i.e., predefined) TDD configuration to a HARQ-ACK transmissions that are to be transmitted/received immediately after the TDD UL/DL re-configuration takes effect (i.e., subframe N), the Hybrid ARQ functionality can be continuously utilized.

According to a first embodiment in line with the first aspect of the invention, a method is proposed for communicating between a mobile station and a base station in a communication system. The communication is re-configured from a source to a target uplink/downlink configuration. The source uplink/downlink configuration is one out of a subset of a plurality of uplink/downlink configurations and the target uplink/downlink configuration is any one of the plurality of uplink/downlink configurations. The plurality of uplink/downlink configurations are pre-configured for Time Division Duplex, TDD, communication. In case the communication is to be re-configured for a predetermined subframe N at the beginning of a radio frame, the communication system is to perform Physical Uplink Shared Channel, PUSCH, transmissions in response to Downlink Control Information, DCI, transmissions such that: the source uplink/downlink configuration is applied to PUSCH transmissions relating to DCI transmissions received up to and including subframe N−6; a predefined uplink/downlink configuration is applied to PUSCH transmissions relating to DCI transmissions received during subframes N−5 to N−1; and the target uplink/downlink configuration is applied to PUSCH transmissions relating to DCI transmissions received from subframe N onward; wherein the predefined uplink/downlink configuration is one of out of the plurality of uplink/downlink configurations.

According to a second embodiment in line with the second aspect of the invention, a method is suggested for communicating between a mobile station and a base station in a communication system. The communication is re-configured from a source to a target uplink/downlink configuration. The source uplink/downlink configuration is a predefined one out of a plurality of uplink/downlink configurations and the target uplink/downlink configuration is any one of the plurality of uplink/downlink configurations. The plurality of uplink/downlink configurations are pre-configured for Time Division Duplex, TDD, communication. In case the communication is to be re-configured for a predetermined subframe N at the beginning of a radio frame, the communication system is to perform Physical Uplink Shared Channel, PUSCH, transmissions in response to Downlink Control Information, DCI, transmissions such that: the source uplink/downlink configuration is applied to PUSCH transmissions relating to DCI transmissions received up to and including subframe N; the target uplink/downlink configuration is applied to PUSCH transmissions relating to DCI transmissions received from subframe N+1 onward.

According to a third embodiment in line with the third aspect of the invention, a method is proposed for communicating between a mobile station and a base station in a communication system. The communication is re-configured from a source to a target uplink/downlink configuration. The source and the target uplink/downlink configuration are out of a plurality of uplink/downlink configurations. The plurality of uplink/downlink configurations are pre-configured for Time Division Duplex, TDD, communication. In case the communication is to be re-configured for a predetermined subframe N at the beginning of a radio frame, the communication system is to perform Hybrid ARQ-ACK transmissions in response to Physical Downlink Shared Channel, PDSCH, transmissions such that: the source uplink/downlink configuration is applied to Hybrid ARQ-ACK transmissions up to and including subframe N−1; another predefined uplink/downlink configuration is applied to Hybrid ARQ-ACK transmissions during subframes N to N+12; and the target uplink/downlink configuration is applied to Hybrid ARQ-ACK transmissions from subframe N+13 onward; wherein the other predefined uplink/downlink configuration is one of out of the plurality of uplink/downlink configurations.

The third embodiment can be combined with either the first or the second embodiment.

Further to the first embodiment, a mobile station is suggested for communicating with a base station in a communication system. The communication is re-configured from a source to a target uplink/downlink configuration. The source uplink/downlink configuration is one out of a subset of a plurality of uplink/downlink configurations and the target uplink/downlink configuration is any one of the plurality of uplink/downlink configurations. The plurality of uplink/downlink configurations are pre-configured for Time Division Duplex, TDD, communication. In case the communication is to be re-configured for a predetermined subframe N at the beginning of a radio frame, the mobile station is to perform Physical Uplink Shared Channel, PUSCH, transmissions in response to Downlink Control Information, DCI, transmissions such that: the source uplink/downlink configuration is applied to PUSCH transmissions relating to DCI transmissions received up to and including subframe N−6; a predefined uplink/downlink configuration is applied to PUSCH transmissions relating to DCI transmissions received during subframes N−5 to N−1; and the target uplink/downlink configuration is applied to PUSCH transmissions relating to DCI transmissions received from subframe N onward; wherein the predefined uplink/downlink configuration is one of out of the plurality of uplink/downlink configurations.

Further to the second embodiment, a mobile station is proposed for communicating with a base station in a communication system. The communication is re-configured from a source to a target uplink/downlink configuration. The source uplink/downlink configuration is a predefined one out of a plurality of uplink/downlink configurations and the target uplink/downlink configuration is any one of the plurality of uplink/downlink configurations. The plurality of uplink/downlink configurations are pre-configured for Time Division Duplex, TDD, communication. In the event that the communication is to be re-configured for a predetermined subframe N at the beginning of a radio frame, the mobile station is to perform Physical Uplink Shared Channel, PUSCH, transmissions in response to Downlink Control Information, DCI, transmissions such that: the source uplink/downlink configuration is applied to PUSCH transmissions relating to DCI transmissions received up to and including subframe N; the target uplink/downlink configuration is applied to PUSCH transmissions relating to DCI transmissions received from subframe N+1 onward.

Further to the third embodiment, a mobile station is proposed for communicating with a base station in a communication system. The communication is re-configured from a source to a target uplink/downlink configuration. The source and the target uplink/downlink configurations are out of a plurality of uplink/downlink configurations. The plurality of uplink/downlink configurations are pre-configured for Time Division Duplex, TDD, communication. In case the communication is to be re-configured for a predetermined subframe N at the beginning of a radio frame, the mobile station is to perform Hybrid ARQ-ACK transmissions in response to Physical Downlink Shared Channel, PDSCH, transmissions such that: the source uplink/downlink configuration is applied to Hybrid ARQ-ACK transmissions up to and including subframe N−1; another predefined uplink/downlink configuration is applied to Hybrid ARQ-ACK transmissions during subframes N to N+12; and the target uplink/downlink configuration is applied to Hybrid ARQ-ACK transmissions from subframe N+13 onward; wherein the other predefined uplink/downlink configuration is one of out of the plurality of uplink/downlink configurations.

Even further to the first embodiment, a computer readable medium is proposed that stores instructions which, when executed by a processor of a mobile station, cause the mobile station to communicate with a base station in a communication system. The communication is re-configured from a source to a target uplink/downlink configuration. The source uplink/downlink configuration is one out of a subset of a plurality of uplink/downlink configurations and the target uplink/downlink configuration is any one of the plurality of uplink/downlink configurations. The plurality of uplink/downlink configurations are pre-configured for Time Division Duplex, TDD, communication. In case the communication is to be re-configured for a predetermined subframe N at the beginning of a radio frame, the mobile station is to perform Physical Uplink Shared Channel, PUSCH, transmissions in response to Downlink Control Information, DCI, transmissions such that: the source uplink/downlink configuration is applied to PUSCH transmissions relating to DCI transmissions received up to and including subframe N−6; a predefined uplink/downlink configuration is applied to PUSCH transmissions relating to DCI transmissions received during subframes N−5 to N−1; and the target uplink/downlink configuration is applied to PUSCH transmissions relating to DCI transmissions received from subframe N onward; wherein the predefined uplink/downlink configuration is one of out of the plurality of uplink/downlink configurations.

Even further to the second embodiment, a computer readable medium is suggested that stores instructions which, when executed by a processor of a mobile station, cause the mobile station to communicate with a base station in a communication system. The communication is re-configured from a source to a target uplink/downlink configuration. The source uplink/downlink configuration is a predefined one out of a plurality of uplink/downlink configurations and the target uplink/downlink configuration is any one of the plurality of uplink/downlink configurations. The plurality of uplink/downlink configurations are pre-configured for Time Division Duplex, TDD, communication. In case the communication is to be re-configured for a predetermined subframe N at the beginning of a radio frame, the mobile station is to perform Physical Uplink Shared Channel, PUSCH, transmissions in response to Downlink Control Information, DCI, transmissions such that: the source uplink/downlink configuration is applied to PUSCH transmissions relating to DCI transmissions received up to and including subframe N; the target uplink/downlink configuration is applied to PUSCH transmissions relating to DCI transmissions received from subframe N+1 onward.

Even further to the third embodiment, a computer readable medium is proposed that stores instructions which, when executed by a processor of a mobile station, cause the mobile station to communicate with a base station in a communication system. The communication is re-configured from a source to a target uplink/downlink configuration. The source uplink/downlink configuration is one out of a subset of a plurality of uplink/downlink configurations and the target uplink/downlink configuration is any one of the plurality of uplink/downlink configurations. The plurality of uplink/downlink configurations are pre-configured for Time Division Duplex, TDD, communication. In case the communication is to be re-configured for a predetermined subframe N at the beginning of a radio frame, the mobile station is to perform Hybrid ARQ-ACK transmissions in response to Physical Downlink Shared Channel, PDSCH, transmissions such that: the source uplink/downlink configuration is applied to Hybrid ARQ-ACK transmissions up to and including subframe N−1; another predefined uplink/downlink configuration is applied to Hybrid ARQ-ACK transmissions during subframes N to N+12; and the target uplink/downlink configuration is applied to Hybrid ARQ-ACK transmissions from subframe N+13 onward; wherein the other predefined uplink/downlink configuration is one of out of the plurality of uplink/downlink configurations.

BRIEF DESCRIPTION OF THE SEVERAL VIEWS OF THE DRAWINGS

In the following the invention is described in more detail with reference to the attached figures and drawings.

FIG. 5 shows the seven currently-standardized (static) TDD UL/DL configurations 0-6, the respective definitions of the 10 subframes and their switch-point periodicity, FIG. 6 illustrates the HARQ ACK/NACK/DTX feedback timing for the static TDD configurations 0-6 as defined by 3GPP LTE, FIG. 7 illustrates Physical Uplink Shared CHannel, PUSCH, transmission timings in response to a Downlink Control Information, DCI, transmission for the static TDD configurations 0-6 as defined by 3GPP LTE, FIG. 11A illustrates an exemplary TDD UL/DL re-configuration operation including the improved PUSCH transmission allocation according to a first embodiment of the invention, FIG. 11B illustrates an exemplary TDD UL/DL re-configuration operation including the improved HARQ-ACK transmission allocation according to a second embodiment of the invention, and FIG. 12 illustrates an exemplary TDD UL/DL re-configuration operation including a different realization of the improved PUSCH transmission allocation according to a third embodiment of the invention.

DETAILED DESCRIPTION

Figure 1:
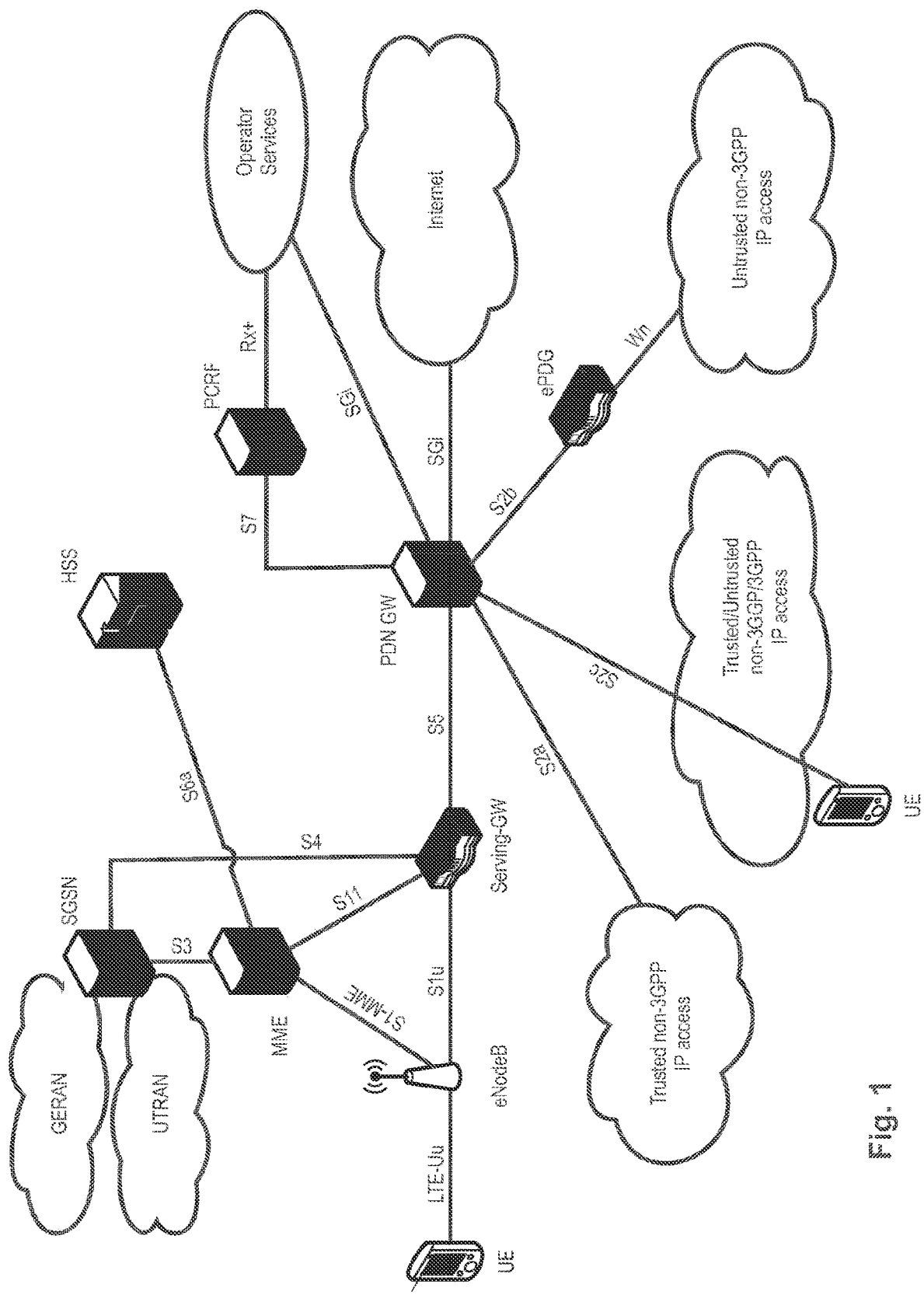
FIG. 1 shows an exemplary architecture of a 3GPP LTE system.
Figure 2:
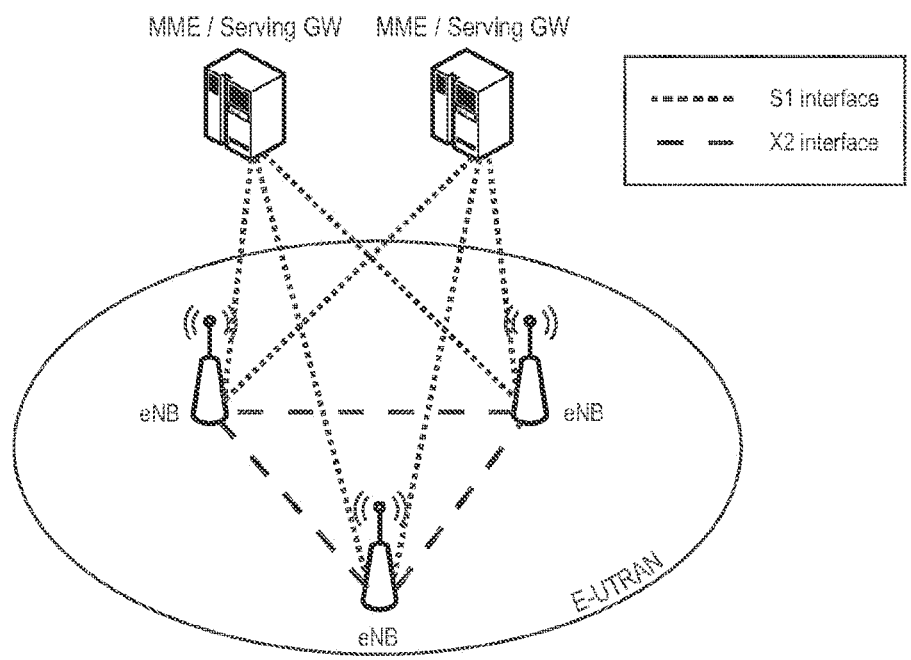
FIG. 2 shows an exemplary overview of the overall E-UTRAN architecture of 3GPP LTE.
Figure 3:
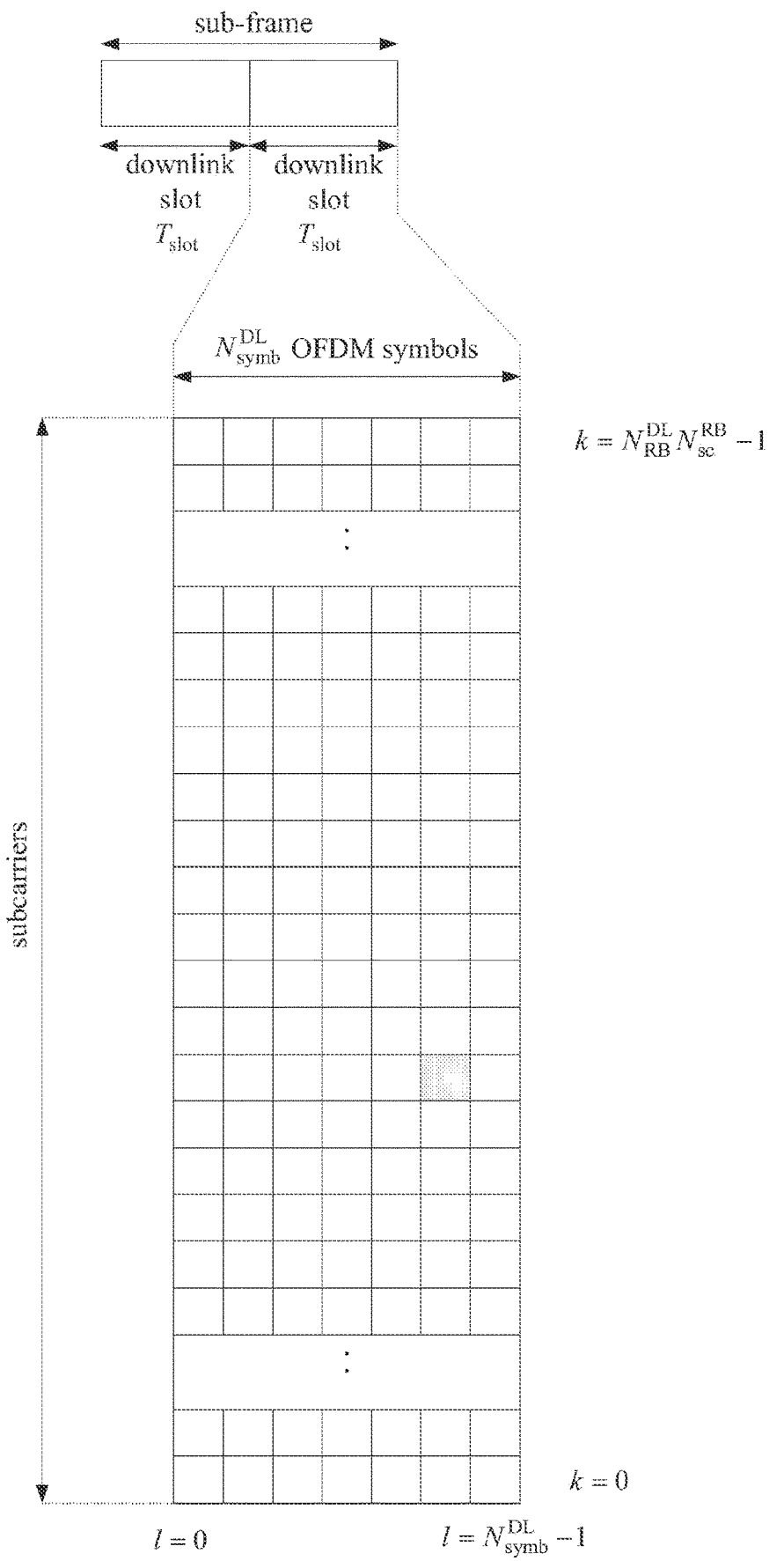
FIG. 3 shows exemplary subframe boundaries on a downlink component carrier as defined for 3GPP LTE (as of Release 8/9)
Figure 4:
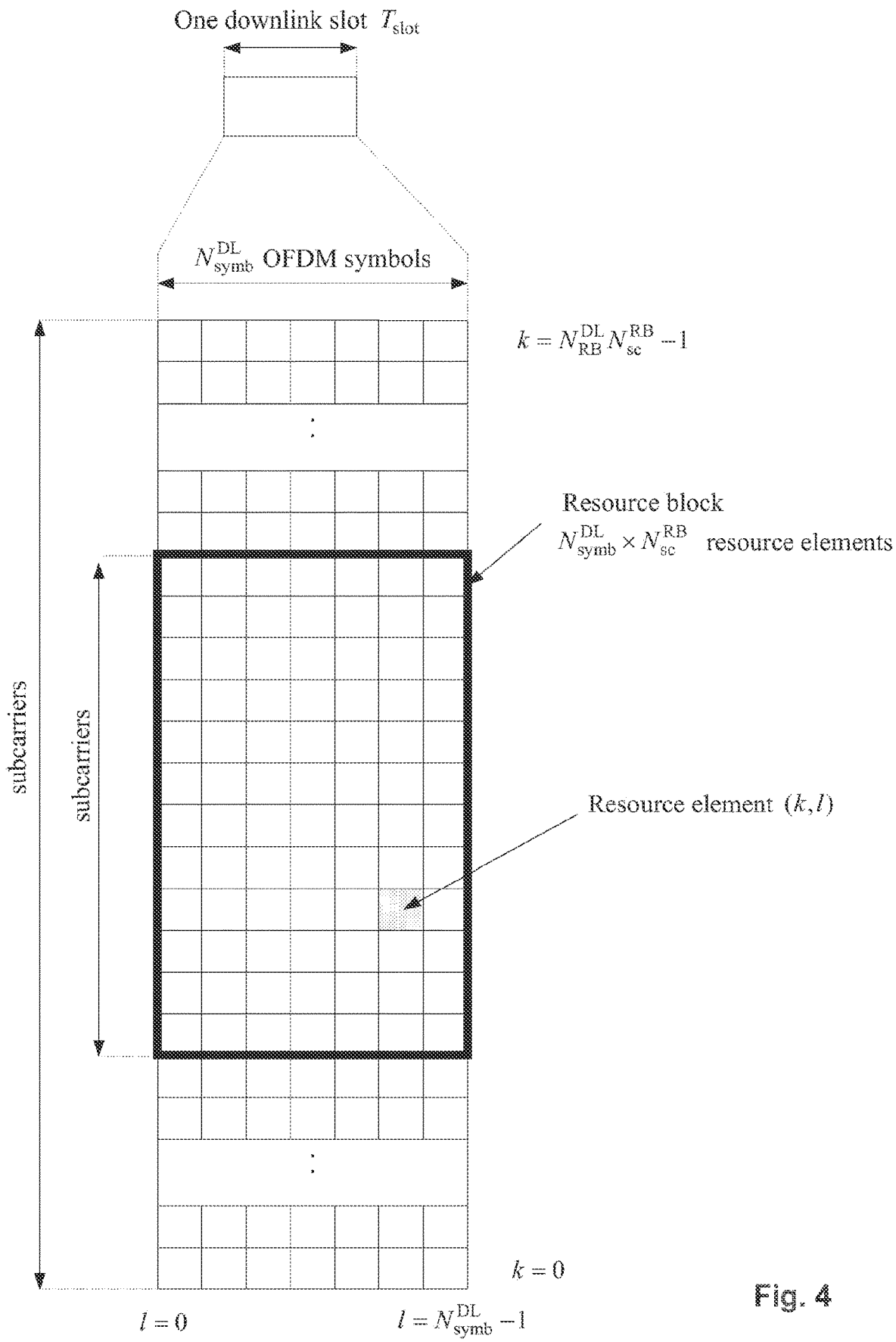
FIG. 4 shows an exemplary downlink resource grid of a downlink slot as defined for 3GPP LTE (as of Release 8/9)
Figure 8:
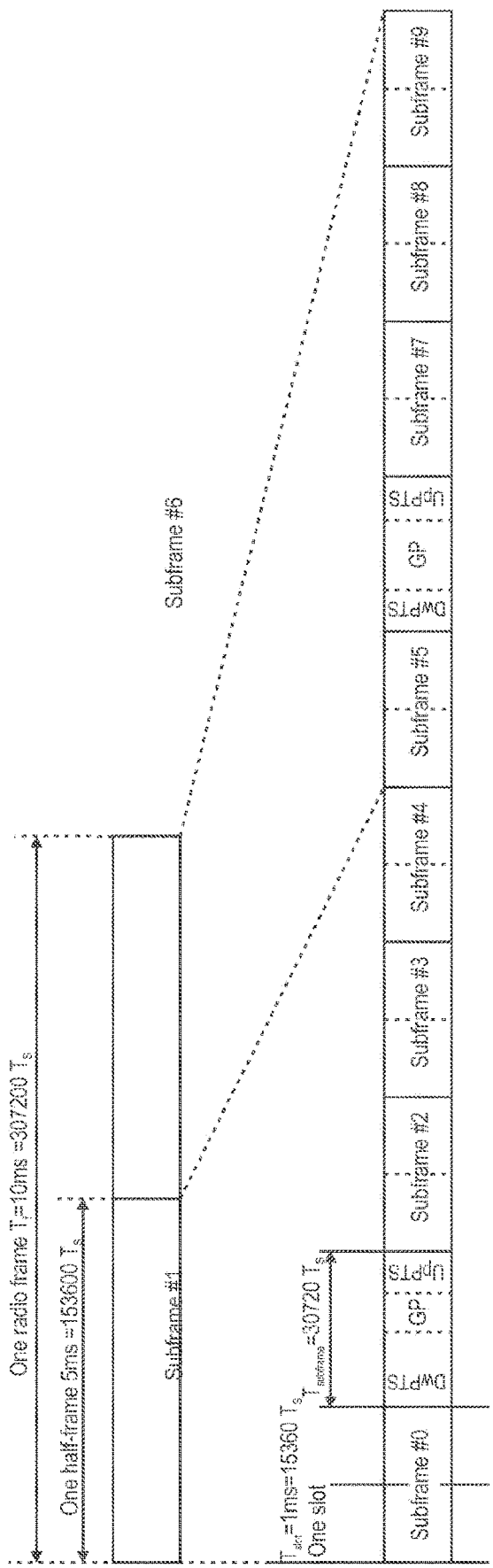
FIG. 8 illustrates the structure of a radio frame, being composed of two half-frames and 10 subframes, for a 5 ms switch-point periodicity, FIGS. 9A, 9B and 10 each show a sequence of exemplary radio frames for three TDD UL/DL re-configuration operations and their drawbacks.

The following paragraphs will describe various embodiments of the invention. For exemplary purposes only, most of the embodiments are outlined in relation to a radio access scheme according to 3GPP LTE (Release 8/9) and LTE-A (Release 10/11/12) mobile communication systems, partly discussed in the Technical Background section above.

It should be noted that the invention may be advantageously used, for example, in a mobile communication system such as 3GPP LTE-A (Release 10/11/12) communication systems as described in the Technical Background section above, but the invention is not limited to its use in this particular exemplary communication networks.

In the context of the invention, the terms "source TDD configuration" or "source uplink/downlink configuration" as well as "target TDD configuration" or "target uplink/downlink configuration" are used to emphasize the concept of the TDD UL/DL re-configuration. Nonetheless, it should be clear that the source TDD configuration is not the first configuration that is to be applied for communication between the mobile station and the base station in the communication system. Similarly, the target TDD configuration is also not the last TDD configuration that is to be applied for communication within the communication system.

Specifically, in the context of the invention the terms source and target TDD configuration may be construed in the sense that in the event a TDD UL/DL re-configuration takes effect in subframe N, the source TDD configuration is at least applied in the interval [N−k, N−6] where k>=10 for the first embodiment and in the interval [N−k, N] where k>=9 in the second embodiment. Similarly, the target TDD configuration is at least applied in the interval [N, N+j] where j>=4 in the first embodiment and [N+1, N+j] where j>=10 in the second embodiment. Similar considerations equally apply for the third and fourth embodiment.

In the following, several embodiments of the invention will be explained in detail. The explanations should not be understood as limiting the invention, but as mere examples of the invention's embodiments to better understand the invention. A skilled person should be aware that the general principles of the invention as laid out in the claims can be applied to different scenarios and in ways that are not explicitly described herein. Correspondingly, the following scenarios assumed for explanatory purposes of the various embodiments shall not limit the invention as such.

The various embodiments explained for the invention in general refer to TDD configurations and in particular shall provide an improved and more flexible TDD configuration and related mechanisms/processes.

First Embodiment

In connection with the summary of the invention, it has already been emphasized that the various embodiments are based on the concept that for a TDD UL/DL re-configuration the timing relations relating to DCI to PUSCH and/or to PDSCH to HARQ-ACK are to be applied differently from the TDD radio frame configuration. This distinction between the TDD radio frame configuration and the timing relations is only to take place during a short period of time before and/or after the re-configuration takes effect.

According to the first embodiment, the DCI to PUSCH timing relations are adapted to allow for an advantageous TDD UL/DL re-configuration. Specifically, in this embodiment the DCI to PUSCH timing relations are adapted during a short period of time before the re-configuration takes effect such that the uplink bandwidth utilization within the communication system can be improved.

Figures 9A, 9B:
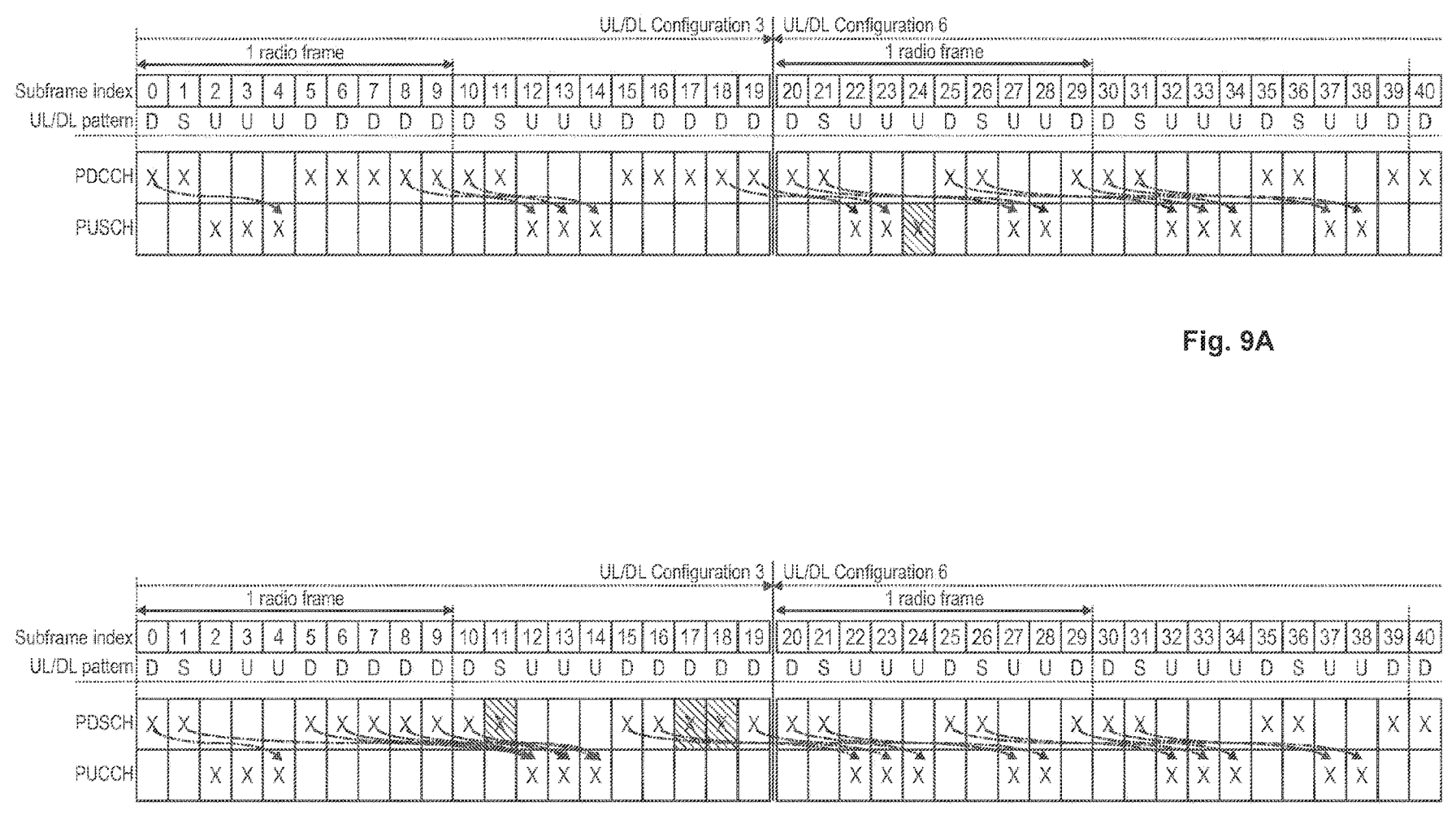
Figures 11A, 11B:
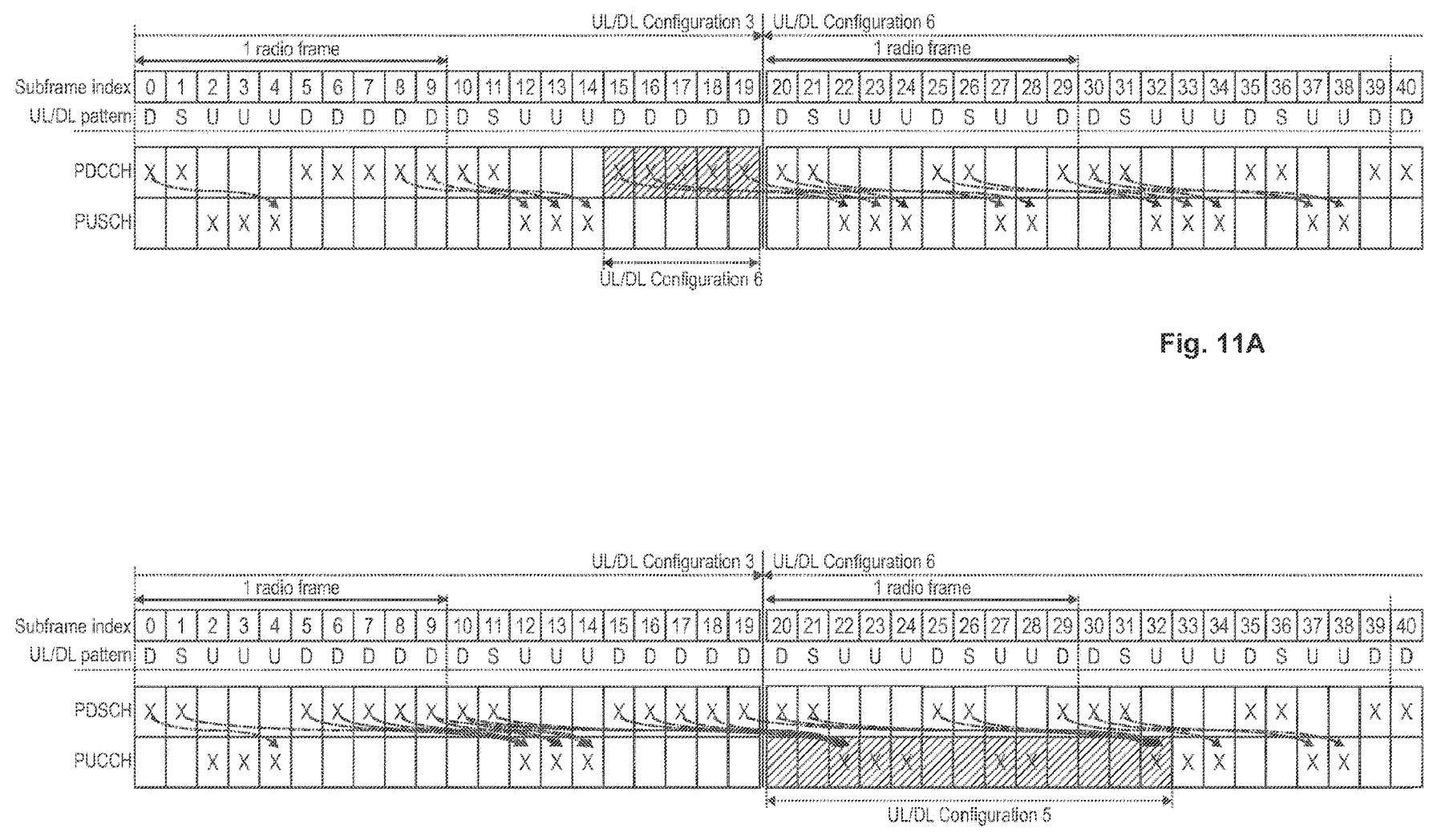

An exemplary TDD UL/DL re-configuration operation according to the first embodiment is illustrated in FIG. 11A, which emphasizes the benefits of the distinction between the TDD radio frame configuration and the DCI to PUSCH timing relation. The TDD UL/DL re-configuration operation shown in FIG. 11A is based on the example illustrated in FIG. 9A. The example of FIG. 11A equally assumes a TDD UL/DL re-configuration from TDD configuration 3 to TDD configuration 6. The re-configuration is to take effect at subframe 20, being the first subframe of a radio frame.

The first embodiment assumes a communication between a mobile station and a base station in a communication system. The communication is to be re-configured from a source to a target TDD configuration. For this first embodiment to be applicable, the source TDD configuration is one out of a subset of a plurality of TDD configurations, and the target TDD configuration is any one of the plurality of TDD configurations. It shall be emphasized that the term "re-configuration" inherently defines that the source TDD configuration is different from the target TDD configuration.

In an advantageous realization, the subset of TDD configurations corresponds to TDD configurations 1-6, and the plurality of TDD configurations corresponds to TDD configurations 0-6. Although in the above advantageous realization, the TDD configuration 0 appears disadvantageous as source TDD configuration for the first embodiment, nonetheless the adapted DCI to PUSCH timing relation may be applied for a TDD UL/DL re-configuration of the first embodiment where the source TDD configuration is TDD configuration 0.

For the communication between the mobile station and the base station to be re-configured, information is distributed within the communication system including the mobile station and the base station. The distribution of the information causes the communication between the mobile station and the base station to be re-configured for a predetermined subframe N, the subframe N being at the beginning of a radio frame.

According to one exemplary implementation, the subframe N, for which the re-configuration takes effect, corresponds to the first subframe in a radio frame. However, according to different exemplary implementations, the subframe N may also correspond to the second, third or fourth subframe in a radio frame.

In response to one or plural Downlink Control Information, DCI, transmission(s), the corresponding Physical Uplink Shared Channel, PUSCH, transmissions are to be performed by the mobile station according to the DCI to PUSCH timing relations defined in this embodiment. Specifically, the term "DCI to PUSCH timing relations" refers to the timing offset as defined by a TDD configuration index between one or plural DCI transmission(s) and the corresponding PUSCH transmission(s).

First, the source TDD configuration is applied by the mobile terminal to PUSCH transmissions relating to DCI transmissions that were received by the mobile station up to and including subframe N−6. Specifically, the mobile station applies the timing relation defined by the source TDD configuration for one or plural PUSCH transmission(s) that are scheduled in response to the one or plural DCI transmission(s) carrying the respective UL grant received during same subframes.

Then, an intermediate (i.e., predefined) TDD configuration is applied by the mobile terminal to PUSCH transmissions relating to DCI transmissions that were received by the mobile station during and including subframe N−5 up to and including subframe N−1. Specifically, the mobile station applies the timing relation defined by the intermediate (i.e., predefined) TDD configuration for the one or plural PUSCH transmission(s) that are scheduled in response to the one or plural DCI transmission(s) carrying the respective UL grant received during same subframes.

Finally, the target TDD configuration is applied by the mobile terminal to PUSCH transmissions relating to DCI transmissions that were received by the mobile station from and including subframe N onward. Specifically, the mobile station applies the timing relation defined by the target TDD configuration for the one or plural PUSCH transmission(s) that are scheduled in response to the one or plural DCI transmission(s) carrying the respective UL grant received during same subframes.

According to an advantageous implementation, the intermediate (i.e., predefined) TDD configuration to be applied for PUSCH transmissions relating to DCI transmissions during subframes N−5 to N−1 is different from the source TDD configuration. In this respect, the Communication system is provided with the possibility to allow application of a TDD configuration as intermediate (i.e., predefined) TDD configuration that prescribes DCI to PUSCH timing relations which mitigate uplink bandwidth losses resulting from the transition between source and target TDD configuration.

According to an advantageous implementation of the first embodiment, the intermediate (i.e., predefined) TDD configuration is TDD configuration 6 as defined in FIG. 7. This TDD configuration 6 allows DCI transmissions carrying UL grants for three subframes of the subsequent radio frame. In particular, in TDD configuration 6 a DCI transmission in subframe 5, 6 and 9 enables a respective PUSCH transmissions in subframes (5+7)=12, (6+7)=13 and (9+5)=14. In this respect, TDD configuration 6 enables PUSCH transmissions in all subframes (i.e., subframes 2, 3 and 4) of the first half of the subsequent radio frame which can be configured to support uplink transmissions (cf. FIG. 5).

Referring to the example shown in FIG. 11A, the TDD configuration 6 is applied to determine the timing relations of DCI to PUSCH for the subframes 15-19 (cf. hatched subframes in FIG. 11A). Specifically, the TDD configuration 6 is applied to PUSCH transmissions relating to DCI subframes that have been received in subframes 15, 16 and 19 such that the TDD configuration 6 prescribes the PUSCH transmissions to be carried out in subframes 22, 23 and 24 after the TDD UL/DL re-configuration has taken effect (cf. dash-dotted arrows in FIG. 11A).

In this respect, the first embodiment allows for the adaptation of the DCI to PUSCH timing relations, namely corresponding to an intermediate (i.e., predefined) TDD configuration, during a short period of time before the re-configuration takes effect. Thereby, un-allocatable PUSCH subframes can be avoided such that the uplink bandwidth utilization within the communication system improves.

Specifically, in the event that TDD configuration 6 is utilized as an intermediate (i.e., predefined) TDD configuration for determining the DCI to PUSCH timing relation of DCI transmissions during subframes N−5 to N−1, all subframes of the first half of the subsequent radio frame can be allocated for PUSCH transmissions. Specifically, the subsequent radio frame is the first radio frame for which the TDD UL/DL re-configuration takes effect.

Second Embodiment

In the second embodiment, similar to the first embodiment, the DCI to PUSCH timing relations are adapted to allow for an advantageous TDD UL/DL re-configuration. Specifically, in this embodiment the DCI to PUSCH timing relations are adapted during a short period of time after the re-configuration takes effect such that the uplink bandwidth utilization within the communication system can be improved.

Also the second embodiment assumes a communication between a mobile station and a base station in a communication system. The communication is to be re-configured from a source to a target TDD configuration. For this second embodiment to be applicable, the source TDD configuration is a predefined one out of a plurality of TDD configurations, and the target TDD configuration is any one of the plurality of TDD configurations. It shall be emphasized that the term "re-configuration" inherently defines that the source TDD configuration is different from the target TDD configuration.

In an advantageous realization, the intermediate (i.e., predefined) one of the plurality of TDD configurations corresponds to TDD configuration 0, and the plurality of TDD configurations corresponds to TDD configurations 0-6. Although in the above advantageous realization, the TDD configurations 1-6 appear disadvantageous as source TDD configurations for the second embodiment, nonetheless the adapted DCI to PUSCH timing relation may be applied for a TDD UL/DL re-configuration of the second embodiment where the source TDD configuration is one of TDD configurations 1-6.

For the communication between the mobile station and the base station to be re-configured, information is distributed within the communication system including the mobile station and the base station. The distribution of the information causes the communication between the mobile station and the base station to be re-configured for a predetermined subframe N, the subframe N being at the beginning of a radio frame.

According to one exemplary implementation, the subframe N, for which the re-configuration takes effect, corresponds to the first subframe in a radio frame. However, according to different exemplary implementations, the subframe N may also correspond to the second, third or fourth subframe in a radio frame.

In response to one or plural Downlink Control Information, DCI, transmission(s), the corresponding Physical Uplink Shared Channel, PUSCH, transmission(s) are to be performed by the mobile station according to the DCI to PUSCH timing relations defined in this embodiment. Specifically, the term "DCI to PUSCH timing relations" refers to the timing offset as defined by a TDD configuration index between one or plural DCI transmission(s) and the corresponding PUSCH transmission(s).

First, the source TDD configuration is applied by the mobile terminal to PUSCH transmissions relating to DCI transmissions that are received by the mobile station up to and including subframe N. Specifically, the mobile station applies the timing relation defined by the source TDD configuration for one or plural PUSCH transmission(s) that are scheduled in response to the one or plural DCI transmission(s) carrying the respective UL grant received during same subframes.

Then, the target TDD configuration is applied by the mobile terminal to PUSCH transmissions relating to DCI transmissions that are received by the mobile station from and including subframe N+1 onward. Specifically, the mobile station applies the timing relation defined by the target TDD configuration for the one or plural PUSCH transmission(s) that are scheduled in response to the one or plural DCI transmission(s) carrying the respective UL grant received during same subframes.

Since the TDD UL/DL re-configuration is configured to take effect for the subframe with the index N at the beginning of a radio frame, it is not possible for N to correspond to the last subframe in a radio frame. In this respect, it is also not possible that the source TDD configuration is applied to PUSCH transmissions relating to DCI transmissions received in one radio frame, and that the target TDD configuration is applied to PUSCH transmissions relating to DCI transmissions received in another (i.e., the subsequent) subframe.

In other words, the definition of the subframe N at the beginning of a radio frame prevents the switch between the application of the source and of the target TDD configuration to correspond to radio frame boundaries. This would only be the case if the source TDD configuration was to be applied to PUSCH transmissions relation to DCI transmissions that were received up to and including subframe N−1.

Specifically, in the advantageous realization, the application of the TDD configuration 0 for a PUSCH transmission relating to a DCI transmission received in subframe N is particularly advantageous because otherwise, the allocation of a PUSCH transmission in subframe 24 could not be ensured. As can be readily appreciated from FIG. 7, the TDD configuration 0 enables TDD transmissions carrying UL grants that relate to two subframes of the subsequent radio frame. In particular, in TDD configuration 0, a DCI transmission in subframe 5 and 6 enables a respective PUSCH transmission in subframes (5+7)=12 and (6+7)=13. However, subframe 14 is also configurable to support PUSCH transmissions.

In this respect, the TDD configuration 0 is also applied to a PUSCH transmission relating to a DCI transmission that has been received in subframe N (e.g., subframe 0, 10, 20) such that the PUSCH transmission in subframe N+4 (e.g., subframe 4, 14, 24) becomes possible. In other words, in case TDD configuration 0 is utilized as an intermediate (i.e., predefined) TDD configuration for determining the DCI to PUSCH timing relation of DCI transmissions during subframes up to and including subframe N, all subframes of the first half of the subsequent radio frame that can be allocated for PUSCH transmissions.

Figure 12:
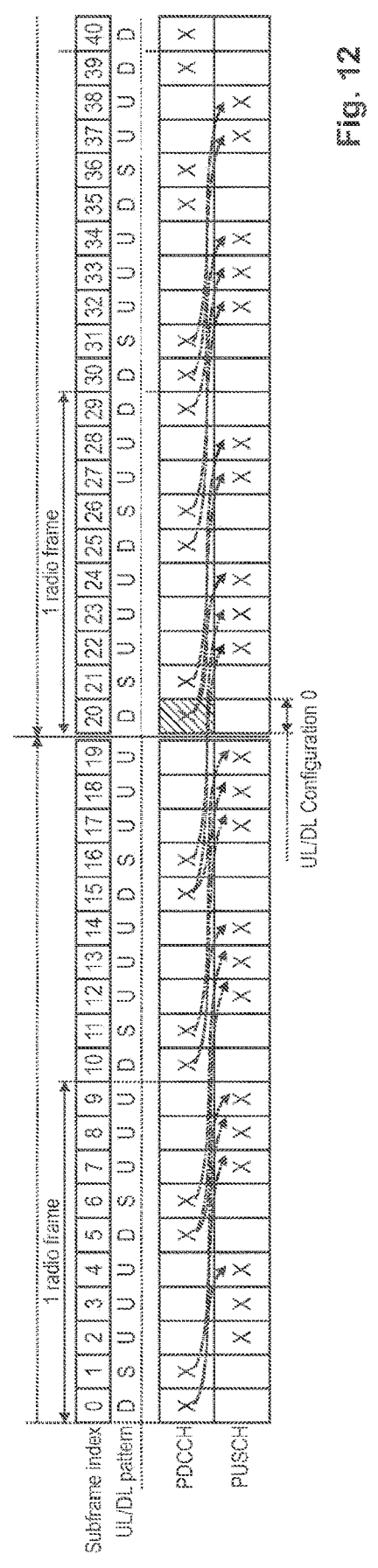

Referring to the example shown in FIG. 12, the TDD configuration 0 is applied to determine the timing relation of DCI to PUSCH for subframe 20 (cf. subframe in FIG. 12). Specifically, TDD configuration 0 is applied to a PUSCH transmission relating to a DCI subframe that has been received in subframe 20; Thus, the TDD configuration 0 prescribes the PUSCH transmission to be carried out in subframe 24 after the TDD UL/DL re-configuration has taken effect (cf. dash-dotted arrow in FIG. 12).

In general, in the first and second embodiment each of the plurality of TDD configurations determines a timing offset between said one or plural DCI transmission(s) and the corresponding PUSCH transmission(s). This timing offset between one or plural DCI transmission(s) and the corresponding PUSCH transmission(s) is also denoted as DCI to PUSCH timing relation throughout the description.

Further, in the first and second embodiment the source TDD configuration specifies whether a subframe is reserved for downlink transmissions, uplink transmissions, or denotes a special subframe supporting downlink as well as uplink transmissions, up to and including subframe N−1, and the target TDD configuration specifies whether a subframe is reserved for downlink transmissions, uplink transmissions, or denotes a special subframe supporting downlink as well as uplink transmissions, from subframe N onward. In this respect, the re-configuration of the TDD radio frame configuration takes effect for and including the indicated subframe N.

Third Embodiment

In connection with the third embodiment of the invention, it shall be again emphasized that the various embodiments are based on the concept that for a TDD UL/DL re-configuration the timing relations relating to DCI to PUSCH and/or to PDSCH to HARQ-ACK are to be applied differently from the TDD radio frame configuration. This distinction between the TDD radio frame configuration and the timing relations is only to take place during a short period of time before and/or after the re-configuration takes effect.

According to the third embodiment, the PDSCH to HARQ-ACK timing relations are adapted to allow for an advantageous TDD UL/DL re-configuration. Specifically, in this embodiment the PDSCH to HARQ-ACK timing relations are adapted during a short period of time after the re-configuration takes effect such that the Hybrid ARQ functionality is consistently available.

An exemplary TDD UL/DL re-configuration operation according to the third embodiment is illustrated in FIG. 11B which emphasizes the benefits of the distinction between the TDD radio frame configuration and the PDSCH to HARQ-ACK timing relations. The TDD UL/DL re-configuration operation shown in FIG. 11B is based on the example illustrated in FIG. 9B. The example of FIG. 11B equally assumes a TDD UL/DL re-configuration from TDD configuration 3 to TDD configuration 6. The re-configuration is to take effect at subframe 20 being the first subframe of a radio frame.

The third embodiment assumes a communication between a mobile station and a base station in a communication system. The communication is to be re-configured from a source to a target TDD configuration. The source and the target TDD configuration are any one out of a plurality of TDD configurations. It shall be emphasized that the term "re-configuration" inherently defines that the source TDD configuration is different from the target TDD configuration.

In an advantageous realization, the source TDD configuration corresponds to one of TDD configurations 0-6, and the target TDD configuration corresponds to another one of TDD configurations 0-6.

For the communication between the mobile station and the base station to be re-configured, information is distributed within the communication system including the mobile station and the base station. The distribution of the information causes the communication between the mobile station and the base station to be re-configured for a predetermined subframe N, the subframe N being at the beginning of a radio frame.

According to one exemplary implementation, the subframe N, for which the re-configuration takes effect, corresponds to the first subframe in a radio frame. However, according to different exemplary implementations, the subframe N may also correspond to the second, third or fourth subframe in a radio frame.

In response to one or plural Physical Downlink Shared CHannel, PDSCH, transmission(s), the related Hybrid ARQ-ACKnowledgement, HARQ-ACK transmissions are to be performed by the mobile station according to the PDSCH to HARQ-ACK timing relations defined in this embodiment. Specifically, the term "PDSCH to HARQ-ACK timing relations" refers to the timing offset as defined by a TDD configuration between one or plural PDSCH transmission(s) and the corresponding HARQ-ACK transmission(s).

First, the source TDD configuration is applied by the mobile station to Hybrid ARQ-ACK transmissions up to and including subframe N−1. Accordingly, the mobile station determines based on the source TDD configuration for each of the subframes up to and including subframe N−1 whether or not one or plural HARQ-ACK transmission(s) have to be carried out. Specifically, the mobile station determines for which of previous one or plural PDSCH transmission(s) (if any) the source TDD configuration indicates HARQ-ACK transmission(s) in the respective subframes.

Then, another intermediate (i.e., predefined) TDD configuration is applied by the mobile station to Hybrid ARQ-ACK transmissions during and including subframe N up to and including subframe N+12. Accordingly, the mobile station determines, based on the other intermediate (i.e., predefined) TDD configuration for each of the subframes during subframe N to N+12, whether or not one or plural HARQ-ACK transmission(s) have to be carried out. Specifically, the mobile station determines for which of previous one or plural PDSCH transmission(s) (i.e., if there are any PDSCH transmissions), the other intermediate (i.e., predefined) TDD configuration indicates HARQ-ACK transmission(s) in the respective subframes.

Finally, the target TDD configuration is applied by the mobile station to Hybrid ARQ-ACK transmissions from and including subframe N+13 onward. Accordingly, the mobile station determines, based on the target TDD configuration for each of the subframes from subframe N+13 onward, whether or not one or plural HARQ-ACK transmission(s) have to be carried out. Specifically, the mobile station determines for which of previous one or plural PDSCH transmission(s) (i.e., if there are any PDSCH transmissions), the target TDD configuration indicates HARQ-ACK transmission(s) in the respective subframes.

According to an advantageous implementation, the other intermediate (i.e., predefined) TDD configuration, to be applied to HARQ-ACK transmissions during subframes N to N+13, is different from the target TDD configuration. In this respect, the Communication system is provided with the possibility to allow application of a TDD configuration as other intermediate (i.e., predefined) TDD configuration that prescribes PDSCH to HARQ-ACK timing relations which makes the Hybrid ARQ functionality consistently available during the transition from source to target TDD configuration.

According to an advantageous implementation of the third embodiment, the other intermediate (i.e., predefined) TDD configuration is TDD configuration 5 as defined in FIG. 6. This TDD configuration 5 allows for HARQ-ACK transmissions relating to PDSCH transmissions that have been received by the mobile terminal in the previous two radio frames. Specifically, in TDD configuration 5, subframe 2 enables combining nine HARQ-ACK transmissions which relate to PDSCH transmissions that were received by the mobile terminal 13, 12, 9, 8, 7, 5, 4, 11 and 6 subframes earlier, respectively.

Referring to the example shown in FIG. 11B, the TDD configuration 5 is applied to determine the timing relations of PDSCH to HARQ-ACK for HARQ-transmissions during subframes 20-32 (cf. hatched subframes in FIG. 11B). Specifically, the TDD configuration 5 is applied to HARQ-ACK transmissions in subframes 22 and 32 such that the TDD configuration 5 prescribes the PDSCH transmissions to which the HARQ-ACK transmissions relate after the TDD UL/DL re-configuration has taken effect (cf. dash-dotted arrows in FIG. 11B).

In this respect, the third embodiment allows for the adaptation of the PDSCH to HARQ-ACK timing relations, namely corresponding to another intermediate (i.e., predefined) TDD configuration, during a short period of time before the re-configuration takes effect. Thereby, PDSCH subframes for which HARQ-ACKs are transmitted can be avoided such that the Hybrid ARQ functionality is consistently available.

First Implementation

According to a first implementation of the third embodiment, the other intermediate (i.e., predefined) TDD configuration is no longer considered to be a static configuration of the communication system. Instead, the other intermediate (i.e., predefined) TDD configuration, which is to be applied to HARQ-ACK transmissions during subframes N to N+12, is signaled within the communication system.

Specifically, an information is distributed within the communication system that is indicating which one out of the plurality of TDD configurations corresponds to the other intermediate (i.e., predefined) TDD configuration. Upon reception of the information indicating the other intermediate (i.e., predefined) TDD configuration by the mobile terminal, the mobile terminal applies this other intermediate (i.e., predefined) TDD configuration for subsequent TDD UL/DL re-configurations, namely during subframes N to N+12 where subframe N indicates the subframe from which onward the re-configuration is to take effect.

Optionally, the information indicating the other intermediate (i.e., predefined) TDD configuration may be combined with an information indicating the subframe from which the communication within the communication system is to be re-configured.

Second Implementation

In a second implementation of the third embodiment, the effect of plural HARQ-ACK transmissions for one PDSCH transmissions is considered in detail. As exemplarily illustrated in FIG. 11B, for the PDSCH transmission in subframes 9 and 10, HARQ-ACK transmissions are effected in response to the application of the source TDD configuration (i.e., TDD configuration 3) and subsequent HARQ-ACK transmissions are effected in response to the application of the other intermediate (i.e., predefined) TDD configuration.

Specifically, plural HARQ-ACK transmissions result from a (i.e., one) PDSCH transmission where the mobile terminal determines that the source TDD configuration prescribes a HARQ-ACK transmission up to and including subframe N−1 relating to the PDSCH transmission, and that the other intermediate (i.e., predefined) TDD configuration prescribes a HARQ-ACK transmission during subframes N to N+12 relating to the same PDSCH transmission.

According to the second implementation the mobile station additionally determines which of potentially plural HARQ-ACK transmissions are to be carried out for one PDSCH transmission. In more detail, in response to a (i.e., one) PDSCH transmission, in the event that the application of the source TDD configuration prescribes a HARQ-ACK transmission up to and including subframe N−1 relating to the PDSCH transmission, and where the application of the other intermediate (i.e., predefined) TDD configuration prescribes a HARQ-ACK transmission during subframes N to N+12 relating to the PDSCH transmission, the mobile node is to only perform the HARQ-ACK transmission up to and including subframe N−1; or, alternatively, the mobile node is to only perform the HARQ-ACK transmission during subframes N to N+12.

Specifically, when the mobile terminal only performs the HARQ-ACK transmission up to and including subframe N−1 the delay for the HARQ-ACK feedback can be kept small. Further, the payload resulting from the HARQ-ACK transmissions during subframes N to N+12 can be reduced.

According to an advantageous variation of the second implementation, in case of plural HARQ-ACK transmissions for a (i.e., one) PDSCH transmission, the mobile station is to perform the HARQ-ACK transmission up to and including subframe N−1, and additionally is to perform the HARQ-ACK transmission during subframes N to N+12 including a predefined information, e.g., a discontinuous transmission, DTX, information.

In more detail, in response to a (i.e., one) PDSCH transmission, in the event that the application of the source TDD configuration prescribes a HARQ-ACK transmission up to and including subframe N−1 relating to the PDSCH transmission, and where the application of the other intermediate (i.e., predefined) TDD configuration prescribes a HARQ-ACK transmission during subframes N to N+12 relating to the PDSCH transmission, the mobile node is to perform the HARQ-ACK transmission up to and including subframe N−1; and is to perform the HARQ-ACK transmission during subframes N to N+12 including a DTX information.

Third Implementation

A third implementation of the third embodiment focuses on HARQ-ACK transmissions that are prescribed by the other intermediate (i.e., predefined) TDD configuration, which, however, relate to preceding subframes that were never reserved for PDSCH transmissions.

As already described in detail with respect to the third embodiment, the other intermediate (i.e., predefined) TDD configuration is applied to determine for which of the preceding PDSCH transmissions a HARQ-ACK transmission is to be performed during subframe N to N+12. This is carried out separately from the TDD radio frame configuration which is specified by the source TDD configuration up to and including subframe N−1 and by the target TDD configuration from the subframe N onward.

In other words, the other intermediate (i.e., predefined) TDD configuration reflects a different TDD radio frame configuration and refers to different (i.e., more) subframes for PDSCH transmission than the source TDD configuration actually reserves.

According to the third implementation, in the event that the application of the other intermediate (i.e., predefined) TDD configuration prescribes a Hybrid ARQ-ACK transmission during subframes N to N+12 for at least one subframe that is configured to only support uplink transmissions, the mobile node is to perform Hybrid ARQ-ACK transmissions during subframes N to N+12 only relating to subframes that are configured to support downlink transmission; or, alternatively, the mobile terminal performs a Hybrid ARQ-ACK transmission including predefined information.

Advantageously, the predefined information may indicate that the said at least one subframe only supports uplink transmissions and does not relate to a PDSCH transmission.

Further Implementation

In any of the preceding embodiments, the communication between the mobile station and the base station may be re-configured for subframe N based on the distribution of information indicating the re-configuration within the communication system.

The distribution of same information causes the communication between the mobile station and the base station to be re-configured for a predetermined subframe N, the subframe N being at the beginning of a radio frame.

In this respect, in the event that the mobile terminal receives information indicating that the communication between the mobile station and the base station is to be re-configured, the mobile terminal is to perform the respective TDD UL/DL re-configuration by applying the timing relations relating to DCI to PUSCH and/or to PDSCH to HARQ-ACK differently (i.e., separately) from the TDD radio frame configuration.

Advantageously, the Information indicating the re-configuration is only considered by the mobile station and/or the base station if it is distributed within an interval including and after subframe N−14 up to and including subframe N−5, where subframe N indicates when the re-configuration is to take effect. In order to reduce the risk of falsely detecting and applying a re-configuration by the mobile station, it is further advantageous if the UE applies a re-configuration only if the information indicating the re-configuration is detected multiple times, e.g., two times, within said interval, and furthermore only if the indicated re-configuration is identical in these multiple times. For example, if the probability of falsely detecting a single re-configuration information amounts to 1%, then the probability of falsely detecting a re-configuration information two times amounts to 0.01%. These approaches are particularly beneficial if a re-configuration is indicated by an explicit message, i.e., by a signal that contains at least the target configuration as information.

An alternative method to determine a re-configuration more implicitly is to check for the non-presence (or lack) of uplink transmissions or uplink resource assignments for PUSCH according to the timing for uplink subframes according to the source UL/DL configuration (or the UL/DL configuration indicated by SIB1). For example, referring to FIG. 5 and FIG. 7, the following table shows preferred embodiments how a lack of PUSCH assignment(s) for a subframe j can indicate a reconfiguration to a target TDD configuration as a function of the source TDD configuration. In an advanced method, only the lack of PUSCH assignment(s) for the first subframe j of a radio frame determines the reconfiguration. For example, if the source configuration is 0 and no PUSCH assignment is detected for subframe 3 of a radio frame, the target configuration is determined as configuration 2. A further lack of PUSCH assignment for subframe 4 of the same radio frame would not further modify the target configuration

| Source configuration | No PUSCH assignment detected for subframe j | Determined target configuration |
|---|---|---|
| 0 | 9 | 6 |
| 0 | 4 | 1 |
| 0 | 3 | 2 |
| 1 | 7 | 4 |
| 1 | 3 | 2 |
| 2 | 7 | 5 |
| 3 | 4 | 4 |
| 3 | 3 | 5 |
| 4 | 3 | 5 |
| 6 | 7 | 3 |
| 6 | 4 | 1 |
| 6 | 3 | 2 |

Fourth Embodiment

According to a fourth embodiment, the concept of the invention is also applied to the signaling of Transmit Power Control, TPC, commands. TPC commands are distributed within the communication system to indicate the transmit power to be used by a mobile station. Accordingly, upon receiving a TPC command, the mobile station considers the value transmitted therein for future uplink transmission.

In 3GPP LTE, TPC commands are specified to only indicate differential power variations of the transmit power to be carried out by the mobile terminal. For example, a TPC command may indicate to a mobile terminal that it is to ramp-up the transmit power by an included amount or that the terminal is to ramp-down the transmit power by another included amount. In this respect a continuous signaling of TPC commands improves the flexibility of power adjustments carried out by the mobile terminal.

It is important to note that the TPC commands may be sent irrespective of uplink transmissions to be carried out by the mobile terminal. In other words, the mobile terminal performs transmit power computations for each subframe prior to an actual uplink transmission based on the TPC commands received. Accordingly, one or plural TPC command(s) are received and the transmit power evaluated by the mobile terminal for a subframe on a constant basis.

Nevertheless, the TPC commands applicable for a given uplink transmission can only be transmitted based on pre-configured timing relations that are comparable to those previously discussed as DCI to PUSCH and/or PDSCH to HARQ-ACK. Specifically, it is distinguished between a TPC command for PUSCH and a TPC command for PUCCH.

The TPC command for PUSCH is included in a DCI transmission carrying an UL grant or in a Transmit Power Control (TPC) command DCI transmission. The DCI transmission including the TPC command for PUSCH is of format 0/4 or of format 3/3A and corresponds to the DCI transmission relating to a PUSCH transmission discussed in connection with the first and second embodiment. Nevertheless, since a TPC command for PUSCH may also be received and be processed as part of the PUSCH power control via a DCI transmission not scheduling a PUSCH, such as by DCI formats 3 and 3A, a different timing relation is defined.

In particular, Table 5.1.1.1-1 defined in 3GPP TS 36.213, Section 5.1.1.1 "UE behaviour", incorporated hereby by reference, defines the timing relationship between the transmission of a TPC command for PUSCH and the processing thereof as part of the PUSCH power control. Specifically, this TPC to PUSCH timing relation is specified in Table 5.1.1.1-1 in reverse subframe direction. In detail, for the PUSCH power control to be performed in subframe i, the mobile terminal refers to a previous TPC command for PUSCH transmission up to and including subframe i-k. In other words, for subframe number i, indicated in the Table 5.1.1.1-1, a TPC command for PUSCH transmission that has been received k subframes prior to the subframe of number i for which the PUSCH power control is to be carried out.

For enabling, during a TDD UL/DL re-configuration, a continuous PUSCH power control at the mobile terminal, the same considerations of the previous embodiments are reflected in the following mechanism, which can be separately performed in case the communication between the mobile terminal and the base station is to be re-configured or can be combined with one of the previous embodiments.

According to one variation, it is assumed that a mobile station communicates with a base station in a communication system. The communication is re-configured from a source to a target TDD configuration. Further, the source TDD configuration is one out of a subset of a plurality of TDD configurations and the target TDD configuration is anyone of the plurality of TDD configurations. The plurality of TDD configurations are pre-configured for Time Division Duplex, TDD, communication. In case the communication is to be re-configured for a predetermined subframe N at the beginning of a radio frame, the mobile station is to perform PUSCH power control in response to a TPC command for PUSCH transmission according to the following scheme:

Firstly, the source TDD configuration is applied for performing PUSCH power control for a subframe relating to a TPC command for PUSCH transmission received up to and including subframe N−6. Then, an intermediate (i.e., predefined) TDD configuration is applied for performing PUSCH power control for a subframe relating to a TPC command for PUSCH transmission received during subframes N−5 to N−1; and Finally, the target TDD configuration is applied for performing PUSCH power control for a subframe relating to a TPC command for PUSCH transmission received from subframe N onward. The intermediate (i.e., predefined) TDD configuration is one of out of the plurality of TDD configurations. Advantageously, the intermediate (i.e., predefined) TDD configuration is different from the source TDD configuration and preferably TDD configuration 6.

According to another variation, it is also assumed that a mobile station communicates with a base station in a communication system. The communication is re-configured from a source to a target TDD configuration. Further, the source TDD configuration is a predefined one out of a plurality of TDD configurations and the target TDD configuration is anyone of the plurality of TDD configurations. The plurality of TDD configurations is pre-configured for Time Division Duplex, TDD, communication.

In case the communication is to be re-configured for a predetermined subframe N at the beginning of a radio frame, the mobile station is to perform PUSCH power control in response to a TPC command for PUSCH transmission according to the following scheme:

Firstly, the source TDD configuration is applied for performing PUSCH power control for a subframe relating to a TPC command for PUSCH transmission received up to and including subframe N. Then, the target TDD configuration is applied for performing PUSCH power control for a subframe relating to a TPC command for PUSCH transmission received from subframe N+1 onward. Advantageously, the source TDD configuration is TDD configuration 0.

According to a further variation, it is also assumed that a mobile station communicates with a base station in a communication system. The communication is re-configured from a source to a target TDD configuration. Further, the source and the target TDD configurations are anyone out of a plurality of TDD configurations. The plurality of TDD configurations is pre-configured for Time Division Duplex, TDD, communication.

In case the communication is to be re-configured for a predetermined subframe N at the beginning of a radio frame, the mobile station is to perform power control adjustments for PUSCH transmissions in response to a TPC command for PUSCH transmission according to the following scheme:

Firstly, the source TDD configuration is applied for performing PUSCH power control for a subframe relating to a TPC command for PUSCH transmission received up to and including subframe N. Then, the target TDD configuration is applied for performing PUSCH power control for a subframe relating to a TPC command for PUSCH transmission received from subframe N+1 onward. Advantageously, the source TDD configuration is TDD configuration 0.

Firstly, for power control adjustments for PUSCH transmissions in subframes up to and including subframe N+1, the source TDD configuration is applied for determining in which subframe the corresponding TPC command is included. Then, for power control adjustments for PUSCH transmissions in subframes N+2 to N+4, an intermediate (i.e., predefined) TDD configuration is applied for determining in which subframe the corresponding TPC command is included; and Finally, for power control adjustments for PUSCH transmissions in subframe N+5 onward, the target TDD configuration is applied for determining in which subframe the corresponding TPC command is included. Alternatively, the last subframe where the source TDD configuration is applied may also be N−1 or N and the first subframe where the intermediate (i.e., predefined) TDD configuration is applied may respectively be N or N+1. The intermediate (i.e., predefined) TDD configuration is one of out of the plurality of TDD configurations. Advantageously, the intermediate (i.e., predefined) TDD configuration is different from the source TDD configuration and preferably TDD configuration 6.

The TPC command for PUCCH is included in a DCI transmission for PDSCH assignments or in a Transmit Power Control (TPC) command DCI transmission. The DCI transmission including the TPC command for PUCCH is of format 1A/1B/1D/1/2A/2/2B/2C/2D and corresponds to the DCI transmission relating to a PDSCH transmission discussed in connection with the third embodiment. Nevertheless, since a TPC command for PUCCH may also be received and be processed as part of the PUCCH power control via a DCI transmission not scheduling a PUCCH a different timing relation is defined.

In particular, the timing relation for PUCCH is defined in 3GPP TS 36.213, Section 5.1.2.1 "UE behaviour", incorporated hereby by reference, referencing Table 10.1.3.1-1 of TS 36.213, Section 10.1.3.1 "TDD HARQ-ACK procedure for one configured serving cell" as timing relationship between the transmission of a TPC command for PUCCH and the processing thereof as part of the PUCCH power control. Specifically, the TPC to PUCCH timing relation is specified to correspond to the PDSCH to HARQ-ACK timing relation. This correspondence between timing relations results from the fact that DCI transmissions, including the TPC command for PUCCH, are effected in the same subframe as the PDSCH transmissions to which the HARQ-ACK transmissions relate.

In this respect, for enabling, during a TDD UL/DL re-configuration, a continuous PUCCH power control at the mobile terminal, the same considerations of the previous embodiments are reflected in the following mechanism, which can be separately performed in case the communication between the mobile terminal and the base station is to be re-configured or can be combined with one of the previous embodiments.

According to yet another variation, it is assumed that a mobile station communicates with a base station in a communication system. The communication is re-configured from a source to a target TDD configuration.

Further, the source TDD configuration is a predefined one out of a plurality of TDD configurations and the target TDD configuration is anyone of the plurality of TDD configurations. The plurality of TDD configurations is pre-configured for Time Division Duplex, TDD, communication.

In case the communication is to be re-configured for a predetermined subframe N at the beginning of a radio frame, the mobile station is to perform PUCCH power control in response to one or plural TPC command(s) for PUCCH transmission according to the following scheme:

Firstly, the source TDD configuration is applied to perform PUCCH power control up to and including subframe N−1. Then, another intermediate (i.e., predefined) TDD configuration is applied to perform PUCCH power control during subframes N to N+12. Finally, the target TDD configuration is applied to perform PUCCH power control from subframe N+13 onward; wherein the other intermediate (i.e., predefined) TDD configuration is one of out of the plurality of TDD configurations. Advantageously, the intermediate (i.e., predefined) TDD configuration is different from the target TDD configuration and preferably TDD configuration 5.

Hardware and Software Implementation of the Invention

Another embodiment of the invention relates to the implementation of the above described various embodiments using hardware and software. In this connection the invention provides an user equipment (mobile station) and an eNodeB (base station). The user equipment is adapted to perform the methods described herein.

It is further recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also, a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may, individually or in arbitrary combination, be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A base station for communicating with a user equipment in a communication system, the base station comprising:
   circuitry, which, in operation, generates a downlink control information (DCI) for reconfiguration from a source uplink/downlink configuration to a target uplink/downlink configuration, wherein the source uplink/downlink configuration is one of a plurality of uplink/downlink configurations and the target uplink/downlink configuration is one of the plurality of uplink/downlink configurations, the plurality of uplink/downlink configurations being configured for Time Division Duplex (TDD) communication;
   a transmitter, which is coupled to the circuitry and which, in operation, transmits the generated DCI to the user equipment to reconfigure the TDD communication, for a subframe N at the beginning of a radio frame; and
   a receiver, which, in operation, performs a Physical Uplink Shared Channel (PUSCH) reception,
   wherein
   the source uplink/downlink configuration is applied to the PUSCH reception performed up to and including subframe N; and
   the target uplink/downlink configuration is applied to PUSCH receptions performed from subframe N+1 onward.

2. The base station according to claim 1, wherein
   the plurality of uplink/downlink configurations are uplink/downlink configurations 0-6; and
   the source uplink/downlink configuration is uplink/downlink configuration 0.

3. The base station according to claim 1, wherein each of the plurality of uplink/downlink configurations determines a timing offset between the DCI and the corresponding PUSCH reception.

4. The base station according to claim 1, wherein
   the source uplink/downlink configuration denotes whether a subframe is reserved for downlink transmissions or for uplink transmissions, or denotes a special subframe supporting downlink and uplink transmissions, up to and including subframe N−1; and
   the target uplink/downlink configuration denotes whether a subframe is reserved for downlink transmissions or for uplink transmissions, or denotes a special subframe supporting downlink and uplink transmissions, from subframe N onward.

5. The base station according to claim 1, wherein, in response to the transmitter performing Physical Downlink Shared Channel (PDSCH) transmissions, the receiver performs Hybrid ARQ-ACK receptions, such that:
   the source uplink/downlink configuration is applied to Hybrid ARQ-ACK receptions up to and including subframe N−1;
   another one of the plurality of uplink/downlink configurations is applied to Hybrid ARQ-ACK receptions during subframes N to N+12; and
   the target uplink/downlink configuration is applied to Hybrid ARQ-ACK receptions from subframe N+13 onward.

6. The base station according to claim 5, wherein the another one of plurality of uplink/downlink configurations is different from the target uplink/downlink configuration.

7. The base station according to claim 5, wherein the another one of the plurality of uplink/downlink configurations is uplink/downlink configuration 5.

8. The base station according to claim 5, wherein information is distributed in the communication system to indicate one of the plurality of uplink/downlink configurations corresponds to the another one of the plurality of uplink/downlink configurations to be applied to Hybrid ARQ-ACK receptions during subframes N to N+12.

9. The base station according to claim 5, wherein each of the plurality of uplink/downlink configurations determines a timing offset between the PDSCH transmission and the corresponding Hybrid ARQ-ACK receptions.

10. A method performed by a base station for communicating with a user equipment in a communication system, the method comprising;
   generating a downlink control information (DCI) for reconfiguration from a source uplink/downlink configuration to a target uplink/downlink configuration, wherein the source uplink/downlink configuration is one of a plurality of uplink/downlink configurations and the target uplink/downlink configuration is one of the plurality of uplink/downlink configurations, the plurality of uplink/downlink configurations being configured for Time Division Duplex (TDD) communication;

transmitting the generated DCI to the user equipment to reconfigure the TDD communication, for a subframe N at the beginning of a radio frame; and performing a Physical Uplink Shared Channel (PUSCH) reception, wherein the source uplink/downlink configuration is applied to the PUSCH reception performed up to and including subframe N; and the target uplink/downlink configuration is applied to PUSCH receptions performed from subframe N+1 onward.

11. The method according to claim 10, wherein the plurality of uplink/downlink configurations are uplink/downlink configurations 0-6; and the source uplink/downlink configuration is uplink/downlink configuration 0.

12. The method according to claim 10, wherein each of the plurality of uplink/downlink configurations determines a timing offset between the DCI and the corresponding PUSCH reception.

13. The method according to claim 10, wherein the source uplink/downlink configuration denotes whether a subframe is reserved for downlink transmissions or for uplink transmissions, or denotes a special subframe supporting downlink and uplink transmissions, up to and including subframe N−1; and the target uplink/downlink configuration denotes whether a subframe is reserved for downlink transmissions or for uplink transmissions, or denotes a special subframe supporting downlink and uplink transmissions, from subframe N onward.

14. The method according to claim 10, comprising:

performing Hybrid ARQ-ACK receptions in response to Physical Downlink Shared Channel (PDSCH) transmissions, such that:

the source uplink/downlink configuration is applied to Hybrid ARQ-ACK receptions up to and including subframe N−1;

another one of the plurality of uplink/downlink configurations is applied to Hybrid ARQ-ACK receptions during subframes N to N+12; and the target uplink/downlink configuration is applied to Hybrid ARQ-ACK receptions from subframe N+13 onward.

15. The method according to claim 14, wherein the another one of plurality of uplink/downlink configurations is different from the target uplink/downlink configuration.

16. The method according to claim 14, wherein the another one of the plurality of uplink/downlink configurations is uplink/downlink configuration 5.

17. The method according to claim 14, wherein information is distributed in the communication system to indicate one of the plurality of uplink/downlink configurations corresponds to the another one of the plurality of uplink/downlink configurations to be applied to Hybrid ARQ-ACK receptions during subframes N to N+12.

18. The method according to claim 14, wherein each of the plurality of uplink/downlink configurations determines a timing offset between the PDSCH transmission and the corresponding Hybrid ARQ-ACK reception.

19. An integrated circuit for controlling a base station configured to communicate with a user equipment in a communication system, the integrated circuit comprising:

control circuitry, which, in operation, generates a downlink control information (DCI) for reconfiguration from a source uplink/downlink configuration to a target uplink/downlink configuration, wherein the source uplink/downlink configuration is one of a plurality of uplink/downlink configurations and the target uplink/downlink configuration is one of the plurality of uplink/downlink configurations, the plurality of uplink/downlink configurations being configured for Time Division Duplex (TDD) communication;

transmitting circuitry, which is coupled to the control circuitry and which, in operation, transmits the generated DCI to the user equipment to reconfigure the TDD communication, for a subframe N at the beginning of a radio frame; and receiving circuitry, which, in operation, performs a Physical Uplink Shared Channel (PUSCH) reception, wherein the source uplink/downlink configuration is applied to the PUSCH reception performed up to and including subframe N; and the target uplink/downlink configuration is applied to PUSCH receptions performed from subframe N+1 onward.

* * * * *